US009755492B2

(12) United States Patent
Nadeau et al.

(10) Patent No.: US 9,755,492 B2
(45) Date of Patent: *Sep. 5, 2017

(54) ROTATABLE TRANSVERSE FLUX ELECTRICAL MACHINE

(71) Applicant: EOCYCLE TECHNOLOGIES INC., Montreal (CA)

(72) Inventors: Raphael Nadeau, Verdun (CA); Daniel Massicotte, Quebec City (CA); Eric Adams, Gaspe (CA); Simon Cote, Gaspe (CA); Patrice Fortin, Gaspe (CA); Jean-Francois Bernier-Synnott, Gaspe (CA)

(73) Assignee: EOCYCLE TECHNOLOGIES INC., Montreal (CA)

( * ) Notice: Subject to any disclaimer, the term of this patent is extended or adjusted under 35 U.S.C. 154(b) by 322 days.

This patent is subject to a terminal disclaimer.

(21) Appl. No.: 13/956,488

(22) Filed: Aug. 1, 2013

(65) Prior Publication Data
US 2014/0035417 A1    Feb. 6, 2014

Related U.S. Application Data

(60) Provisional application No. 61/679,476, filed on Aug. 3, 2012.

(51) Int. Cl.
*H02K 1/27*    (2006.01)
*H02K 21/12*    (2006.01)
(Continued)

(52) U.S. Cl.
CPC ............ *H02K 41/02* (2013.01); *H02K 1/145* (2013.01); *H02K 1/185* (2013.01); *H02K 1/2713* (2013.01);
(Continued)

(58) Field of Classification Search
CPC ............ H02K 2201/03; H02K 2201/06; H02K 2201/12
(Continued)

(56) References Cited

U.S. PATENT DOCUMENTS

| 3,680,671 A | 8/1972 | Searl |
| 3,710,158 A * | 1/1973 | Bachle .................... G01P 3/465 |
| | | 310/156.02 |

(Continued)

FOREIGN PATENT DOCUMENTS

| EP | 1 005 136 | 5/2000 |
| EP | 1 063 754 | 6/2000 |

(Continued)

OTHER PUBLICATIONS

Shrestha et. al. 2008 International Conference on Electrical Machines; "A New Concept for Weight Reduction of Large Direct Drive Machines".*

(Continued)

*Primary Examiner* — Burton Mullins
(74) *Attorney, Agent, or Firm* — Mathieu Audet

(57) ABSTRACT

The invention concerns a rotatable transverse flux electrical machine (TFEM) comprising a stator portion; and a rotor portion rotatably located in respect with the stator portion, the rotor portion including an alternate sequence of magnets and concentrators radially disposed about a rotation axis thereof; the stator portion including at least one phase, the at least one phase including a plurality of cores cooperating with a coil disposed about the rotation axis, each core including a skewed pair of poles to progressively electromagnetically engage an electromagnetic field of respective cooperating concentrators. The invention is also concerned with a plurality of elements located in desired positions in the TFEM and also with a linear TFEM.

20 Claims, 25 Drawing Sheets

(51) Int. Cl.

| | |
|---|---|
| *H02K 41/03* | (2006.01) |
| *H02K 41/02* | (2006.01) |
| *H02K 15/03* | (2006.01) |
| *H02K 1/18* | (2006.01) |
| *H02K 21/14* | (2006.01) |
| *H02K 1/14* | (2006.01) |
| *H02K 5/173* | (2006.01) |
| *H02K 7/18* | (2006.01) |
| *H02K 15/16* | (2006.01) |

(52) U.S. Cl.
CPC ......... *H02K 1/2773* (2013.01); *H02K 5/1732* (2013.01); *H02K 15/03* (2013.01); *H02K 21/145* (2013.01); *H02K 7/1838* (2013.01); *H02K 15/16* (2013.01); *H02K 2201/12* (2013.01); *H02K 2205/00* (2013.01); *H02K 2213/03* (2013.01); *H02K 2213/12* (2013.01); *Y10T 29/49009* (2015.01); *Y10T 29/49012* (2015.01)

(58) Field of Classification Search
USPC ......... 310/156.02; 29/596, 603.16, 605–607; 156/43, 45, 155
See application file for complete search history.

(56) References Cited

U.S. PATENT DOCUMENTS

| | | | |
|---|---|---|---|
| 4,012,083 A | 3/1977 | Habermann et al. | |
| 4,318,019 A | 3/1982 | Teasley et al. | |
| 4,613,842 A | 9/1986 | Ichiyama et al. | |
| 4,933,581 A | 6/1990 | Shramo | |
| 4,970,776 A | 11/1990 | Yamamoto et al. | |
| 5,010,262 A | 4/1991 | Nakagawa | |
| 5,176,946 A | 1/1993 | Wieloch | |
| 5,633,551 A | 5/1997 | Weh | |
| 5,854,521 A | 12/1998 | Nolle | |
| 5,872,409 A | 2/1999 | Jung | |
| 6,051,904 A | 4/2000 | Akemakou | |
| 6,060,810 A | 5/2000 | Lee et al. | |
| 6,111,329 A | 8/2000 | Graham et al. | |
| 6,127,749 A * | 10/2000 | Sogard ..................... | 310/12.06 |
| 6,169,350 B1 | 1/2001 | Yang | |
| 6,255,754 B1 | 7/2001 | Savage et al. | |
| 6,568,065 B2 | 5/2003 | Graham et al. | |
| 6,664,704 B2 | 12/2003 | Calley | |
| 6,700,229 B2 | 3/2004 | Sadarangani | |
| 6,717,323 B1 * | 4/2004 | Soghomonian et al. ....... | H02K 1/141 310/156.47 |
| 6,768,238 B2 | 7/2004 | Knauff et al. | |
| 6,841,908 B2 | 1/2005 | Hasegawa et al. | |
| 6,849,969 B2 | 2/2005 | Kang et al. | |
| 6,870,294 B2 | 3/2005 | Holzheu et al. | |
| 6,873,082 B2 | 3/2005 | Neet | |
| 6,888,272 B2 | 5/2005 | Kastinger | |
| 6,952,068 B2 | 10/2005 | Gieras et al. | |
| 6,979,925 B2 | 12/2005 | Schwamm | |
| 7,030,534 B2 | 4/2006 | Caamano | |
| 7,084,731 B2 | 8/2006 | Kubo | |
| 7,124,495 B2 | 10/2006 | Gieras et al. | |
| 7,164,220 B2 | 1/2007 | Gilmour | |
| 7,166,938 B2 | 1/2007 | Kang et al. | |
| 7,230,361 B2 | 6/2007 | Hirzel | |
| 7,279,820 B2 * | 10/2007 | Grundl ................. | H02K 21/145 310/156.02 |
| 7,305,752 B2 | 12/2007 | Graham | |
| 7,327,062 B2 | 2/2008 | Kaneko | |
| 7,328,500 B2 | 2/2008 | Kim et al. | |
| 7,342,475 B2 | 3/2008 | Weger | |
| 7,355,309 B2 | 4/2008 | Costin et al. | |
| 7,358,639 B2 | 4/2008 | Caamano | |
| 7,466,054 B2 | 12/2008 | Watson | |
| 7,466,058 B2 * | 12/2008 | Dubois et al. ................. | 310/257 |
| 7,474,019 B2 | 1/2009 | Kang et al. | |
| 7,561,016 B2 | 7/2009 | Kubo | |
| 7,579,742 B1 * | 8/2009 | Rittenhouse .................. | 310/257 |
| 7,605,515 B2 | 10/2009 | Koehler | |
| 7,608,968 B2 | 10/2009 | Toyoda et al. | |
| 7,626,308 B2 | 12/2009 | Kang et al. | |
| 7,626,309 B2 | 12/2009 | Watson | |
| 7,638,919 B2 | 12/2009 | Pulnikov et al. | |
| 7,669,311 B2 | 3/2010 | Iomel et al. | |
| 7,675,213 B2 | 3/2010 | Tenhunen | |
| 7,723,891 B2 | 5/2010 | Rittenhouse | |
| 7,755,244 B2 | 7/2010 | Ley et al. | |
| 7,772,741 B1 | 8/2010 | Rittenhouse | |
| 7,851,965 B2 | 12/2010 | Calley et al. | |
| 7,854,059 B2 | 12/2010 | Tapper | |
| 7,868,508 B2 | 1/2011 | Calley et al. | |
| 7,911,104 B2 | 3/2011 | Ifrim et al. | |
| 7,919,897 B2 | 4/2011 | Tajima et al. | |
| 7,923,886 B2 | 4/2011 | Calley et al. | |
| 7,952,252 B2 | 5/2011 | Kang et al. | |
| 7,969,048 B2 | 6/2011 | Ryan | |
| 7,973,446 B2 | 7/2011 | Calley et al. | |
| 7,994,678 B2 | 8/2011 | Calley et al. | |
| 8,008,821 B2 | 8/2011 | Calley et al. | |
| 8,030,814 B2 | 10/2011 | Sun et al. | |
| 8,030,819 B2 | 10/2011 | Calley et al. | |
| 8,033,007 B2 | 10/2011 | Jeung et al. | |
| 8,053,944 B2 | 11/2011 | Calley et al. | |
| 8,138,652 B2 * | 3/2012 | Davis et al. ................... | 310/168 |
| 8,421,463 B2 * | 4/2013 | Crozier et al. ................ | 324/319 |
| 8,692,639 B2 * | 4/2014 | Baarman et al. .............. | 336/200 |
| 2004/0251759 A1 | 12/2004 | Hirzel | |
| 2006/0082237 A1 | 4/2006 | Kerlin | |
| 2006/0244324 A1 | 11/2006 | Graham et al. | |
| 2006/0255679 A1 | 11/2006 | Dine et al. | |
| 2008/0211326 A1 * | 9/2008 | Kang et al. ..................... | 310/44 |
| 2008/0238232 A1 | 10/2008 | Bando et al. | |
| 2008/0246362 A1 | 10/2008 | Hirzel | |
| 2009/0007419 A1 | 1/2009 | Kubo | |
| 2009/0026866 A1 | 1/2009 | Groening et al. | |
| 2009/0108712 A1 | 4/2009 | Holtzapple et al. | |
| 2009/0134734 A1 * | 5/2009 | Nashiki ..................... | B60L 7/00 310/162 |
| 2010/0013343 A1 | 1/2010 | Bi | |
| 2010/0038169 A1 | 2/2010 | Lee | |
| 2010/0163061 A1 | 7/2010 | Creighton | |
| 2010/0192357 A1 | 8/2010 | Mitsui et al. | |
| 2010/0253930 A1 | 10/2010 | Ito | |
| 2010/0307285 A1 | 12/2010 | Underwood | |
| 2010/0308679 A1 | 12/2010 | Yamashita et al. | |
| 2011/0050020 A1 | 3/2011 | Lazic et al. | |
| 2011/0074231 A1 | 3/2011 | Soderberg | |
| 2011/0084564 A1 | 4/2011 | Huang | |
| 2011/0148224 A1 | 6/2011 | Tokoi et al. | |
| 2011/0169357 A1 | 7/2011 | Gieras et al. | |
| 2011/0169365 A1 * | 7/2011 | Calley et al. ............ | 310/156.02 |
| 2011/0169369 A1 | 7/2011 | Calley et al. | |
| 2011/0248585 A1 | 10/2011 | Wang et al. | |
| 2011/0273035 A1 | 11/2011 | Calley et al. | |
| 2011/0278966 A1 | 11/2011 | Osborne et al. | |
| 2011/0278978 A1 | 11/2011 | Taniguchi et al. | |
| 2011/0298330 A1 | 12/2011 | Joeckel | |
| 2011/0304146 A1 | 12/2011 | Surodin | |
| 2012/0025637 A1 | 2/2012 | Calley et al. | |
| 2012/0032537 A1 | 2/2012 | Yamashita et al. | |
| 2012/0038169 A1 | 2/2012 | Azanza Ladr n et al. | |
| 2012/0038236 A1 | 2/2012 | Tajima et al. | |
| 2012/0086302 A1 | 4/2012 | Hashimoto et al. | |
| 2012/0091832 A1 | 4/2012 | Soderberg | |
| 2012/0235668 A1 * | 9/2012 | Janecek et al. ........... | 324/117 H |
| 2013/0234554 A1 * | 9/2013 | Tanaka ................. | H02K 21/145 310/156.02 |

FOREIGN PATENT DOCUMENTS

| | | |
|---|---|---|
| EP | 2317633 A2 * | 5/2011 |
| JP | 55121622 | 9/1980 |
| JP | 55121623 | 9/1980 |

(56) References Cited

FOREIGN PATENT DOCUMENTS

| | | |
|---|---|---|
| JP | 57090924 | 6/1982 |
| JP | 4094515 | 3/1992 |
| JP | 4094516 | 3/1992 |
| JP | 5003127 | 1/1993 |
| JP | 5036546 | 2/1993 |
| WO | WO 88/06375 | 8/1988 |
| WO | WO 02/075895 | 9/2002 |
| WO | WO 2007/134566 | 11/2007 |
| WO | WO 2010/061200 | 6/2010 |
| WO | WO 2011/064550 | 6/2011 |
| WO | WO 2011/116776 | 9/2011 |
| WO | WO 2012/011191 | 1/2012 |

OTHER PUBLICATIONS

Project UpWind, Research Report Electromagnetic Optimization of Direct-drive generators; authors: Deok-je Bang, Henk Polinder ; Affiliation: Delft University of Technology (Netherlands) ; Oct. 19, 2010.

A New Concept for Weight Reduction of Large Direct Drive Machines; authors: G. Shresta, H. Plinder, D.J. Bang, J.A. Ferreira, A.S. McDonald ; Affiliation: Delf University of Technology (Netherlands) and WO (Great Britain) ; 2008.

Air-gap magnetic field design optimization for U-shaped ironless permanent magnet linear synchronous motors ; author: Peng Sun ; Affiliation: University of Beijing Huixing Zhou (People's Republic of China) ; Oct. 2008.

Design Considerations of Permanent Magnet Transverse Flux Machines; Authors: Kaiyuan Lu, Peter Omand Rasmussen, Ewen Ritchie ; Affiliation: Aalborg University (Denmark) ; Oct. 2011.

Soft Magnetic Composite with Lamellar Particles—Application to the Clawpole Transverse-Flux Machine with Hybrid Stator ; Authors: Patrick Lemieux, O. Jude Delma, Maxime R. Dubois, Roderick Guthrie ; Affiliation: McGill Metal Processing Center et Laboratoire d'Électronique, d'Électronique de Puissance et de Commande Industrielle (LEEPCI) (Canada) ; 2008.

Structural analysis and optimization of transverse flux permanent magnet machines for 5 and 10 MW direct drive wind turbines ; Authors: A. Zavvos, D. Bang, A.S. McDonald, H. Polinder, M. Mueller ; Affiliation: Delf University of Technology (Netherlands) and University of Edinburgh (Great Britain) ; Jan. 20, 2012.

Study of permanent magnet transverse flux motors with soft magnetic composite core ; Authors: Y.G. Guo and J.G. Zhu ; Affiliation: University of Technology, Sydney (Australia) ; Sep. 26-29, 2004.

The air gap and angle optimixation in the axial flux permanent Magnet motor ; Authors: C. Akuner et E. Huner.

* cited by examiner

ROTATABLE TRANSVERSE FLUX ELECTRICAL MACHINE

CROSS REFERENCE

The present application relies to, is a non-provisional application of, and claims priority under 35 U.S.C. 119(e) to U.S. provisional application No. 61/679,476, filed Aug. 3, 2012, entitled TRANSVERSE FLUX ELECTRICAL MACHINE, which is incorporated herein by reference in its entirety.

BACKGROUND OF THE INVENTION

1. Field of the Invention

This invention relates generally to rotatable transverse flux electrical machines. The present invention more specifically relates to transverse flux alternators and motors producing low cogging torque and ripple torque.

2. Description of the Related Art

Alternators and motors are used in a variety of machines and apparatuses to produce electricity from mechanical movements. They find applications for energy production and transportation, to name a few. Alternators and motors can use Transverse Flux Permanent Magnet (TFPM) technologies.

Transverse flux machines with permanent magnet excitation are known from the literature, such as the dissertation by Michael Bork, Entwicklung and Optimierung einer fertigungsgerechten Transversalflußmaschine [Developing and Optimizing a Transverse Flux Machine to Meet Production Requirements], Dissertation 82, RWTH Aachen, Shaker Verlag Aachen, Germany, 1997, pages 8 ff. The circularly wound stator winding is surrounded by U-shaped soft iron cores (yokes), which are disposed in the direction of rotation at the spacing of twice the pole pitch. The open ends of these U-shaped cores are aimed at an air gap between the stator and rotor and form the poles of the stator. Facing them, permanent magnets and concentrators are disposed in such a way that the magnets and concentrators that face the poles of a stator core have the opposite polarity. To short-circuit the permanent magnets, which in the rotor rotation are intermittently located between the poles of the stator and have no ferromagnetic short circuit, short-circuit elements are disposed in the stator.

Put otherwise, transverse flux electrical machines include a circular stator and a circular rotor, which are separated by an air space called air gap, that allows a free rotation of the rotor with respect to the stator, and wherein the stator comprises soft iron cores, that direct the magnetic flux in a direction that is mainly perpendicular to the direction of rotation of the rotor. The stator of transverse flux electrical machines also comprises electrical conductors, defining a toroid coil, which is coiled in a direction that is parallel to the direction of rotation of the machine. In this type of machine, the rotor comprises a plurality of identical permanent magnet parts, which are disposed so as to create an alternated magnetic flux in the direction of the air gap. This magnetic flux goes through the air gap with a radial orientation and penetrates the soft iron cores of the stator, which directs this magnetic flux around the electrical conductors.

In the transverse flux electrical machine of the type comprising a rotor, which is made of a plurality of identical permanent magnet parts, and of magnetic flux concentrators, the permanent magnets are oriented in such a manner that their magnetization direction is parallel to the direction of rotation of the rotor. Magnetic flux concentrators are inserted between the permanent magnets and redirect the magnetic flux produced by the permanent magnets, radially towards the air gap.

The transverse flux electrical machine includes a stator, which comprises horseshoe shaped soft iron cores, which are oriented in such a manner that the magnetic flux that circulates inside these cores, is directed in a direction that is mainly perpendicular to the axis of rotation of the rotor.

The perpendicular orientation of the magnetic flux in the cores of the stator, with respect to the rotation direction, gives to transverse flux electrical machines a high ratio of mechanical torque per weight unit of the electrical machine. These TFPM alternators are also known to generate significant cogging torque and ripple torque.

Cogging torque of electrical machines is the torque due to the interaction between the permanent magnets of the rotor and the stator slots of a Permanent Magnet (PM) machine. It is also known as detent or 'no-current' torque having a variable reluctance function of the position. This torque is position dependent and its periodicity per revolution depends on the number of magnetic poles on the stator. Typically, the fundamental frequency of the torque is twice the standard torque of the alternator and, in theory, produces a zero energy balance (when losses are neglected). Cogging torque is an undesirable component for the operation of such an electrical machine. It is especially prominent at lower speeds, with the symptom of jerkiness. Cogging torque results in torque as well as speed ripple; however, at high speed the electrical machine moment of inertia can significantly filter out the effect of cogging torque.

The ripple torque is a variation of the torque in respect of the nominal torque and is generally stated in percentage. Typically, the fundamental frequency of the ripple torque is about three times the fundamental frequency of a single phase of the torque in a triphased electrical machine. Ripple torque is generally represented by an altered sinusoidal wave. The ripple torque in electrical machines is caused by many factors such as cogging torque, the interaction between the MMF and the air gap flux harmonics, or mechanical imbalances, e.g. eccentricity of the rotor. Ripple torque is defined as the percentage of the difference between the maximum torque Tmax and the minimum torque Tmin compared to the average torque Tavg:

$$((T_{max} - T_{min})/T_{avg}) \times 100 \qquad \text{Equation 1}$$

Ripple torque in electrical machines is generally undesirable, since it causes vibrations and noise, and might reduce the lifetime of the machine. Extensive ripple torque can require measures such changes to the machine geometry that might reduce the general performance of the machine.

Under load, there is an additional component contributing to the ripple torque in addition to the cogging torque: Ripple torque due to the interaction between the magneto motive force (MMF) and the air gap flux harmonics. This component can be influenced by changes to the geometry of the electrical machine.

A machine with a low cogging torque might have a high ripple torque whereas a machine with a high cogging torque might have a low ripple torque. The interaction between the MMF and air gap flux harmonics can compensate or increase the cogging torque or ripple torque in different cases. Cogging torque cannot be acted upon by a change in voltage or current.

It is therefore desirable to produce an electrical machine producing low vibrations, cogging torque and low ripple torque. It is furthermore desirable to provide an electrical machine that minimizes recourse to electrical adjustments to minimize vibrations, cogging torque and ripple torque. It is also desirable to provide an electrical machine that is economical to produce. Other deficiencies will become apparent to one skilled in the art to which the invention pertains in view of the following summary and detailed description with its appended figures.

SUMMARY OF THE INVENTION

Figure 1:
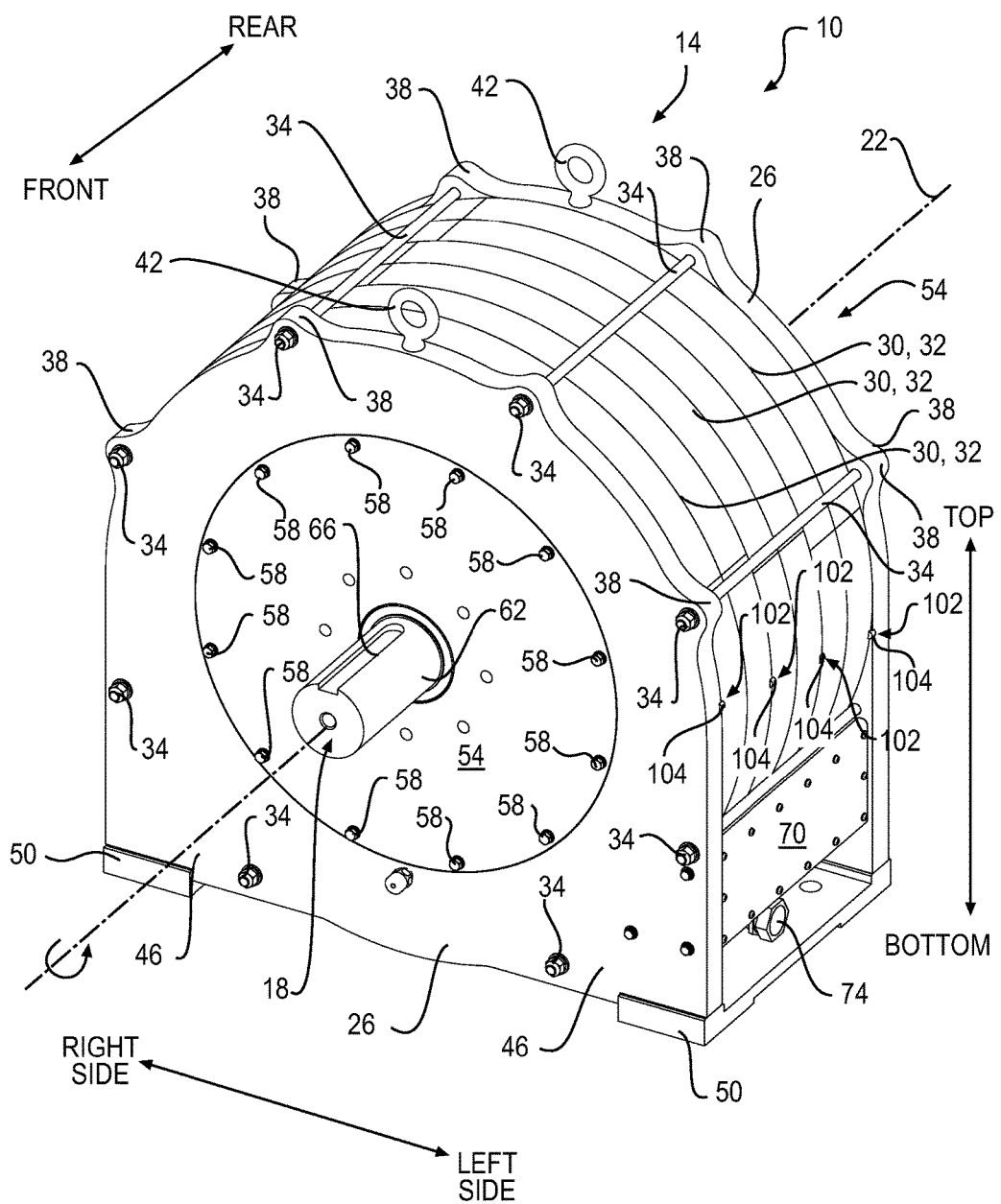
FIG. 1 is an isometric view of a TFEM in accordance with at least one embodiment of the invention.
Figure 2:
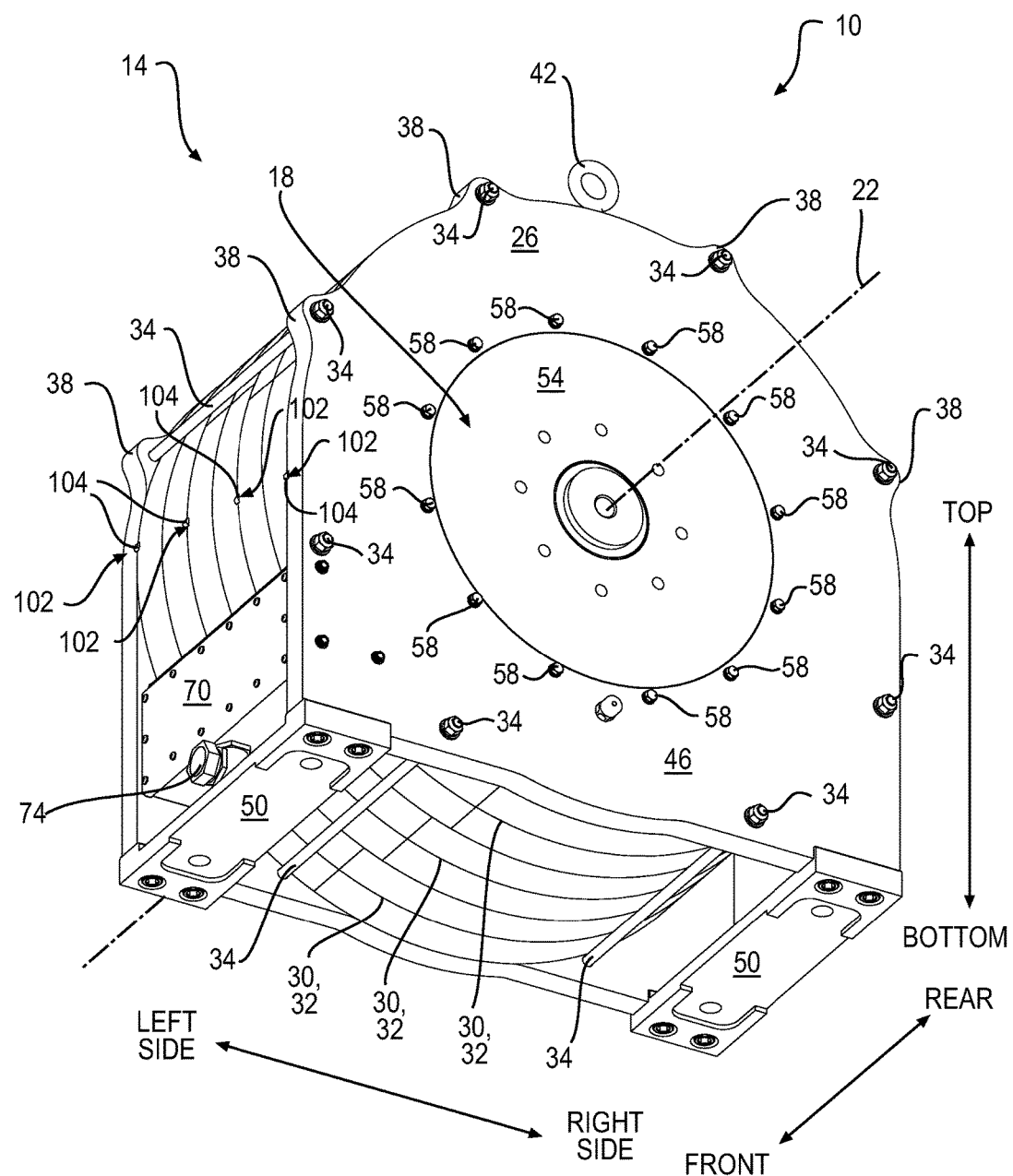
FIG. 2 is an isometric view of a TFEM in accordance with at least one embodiment of the invention.
Figure 3:
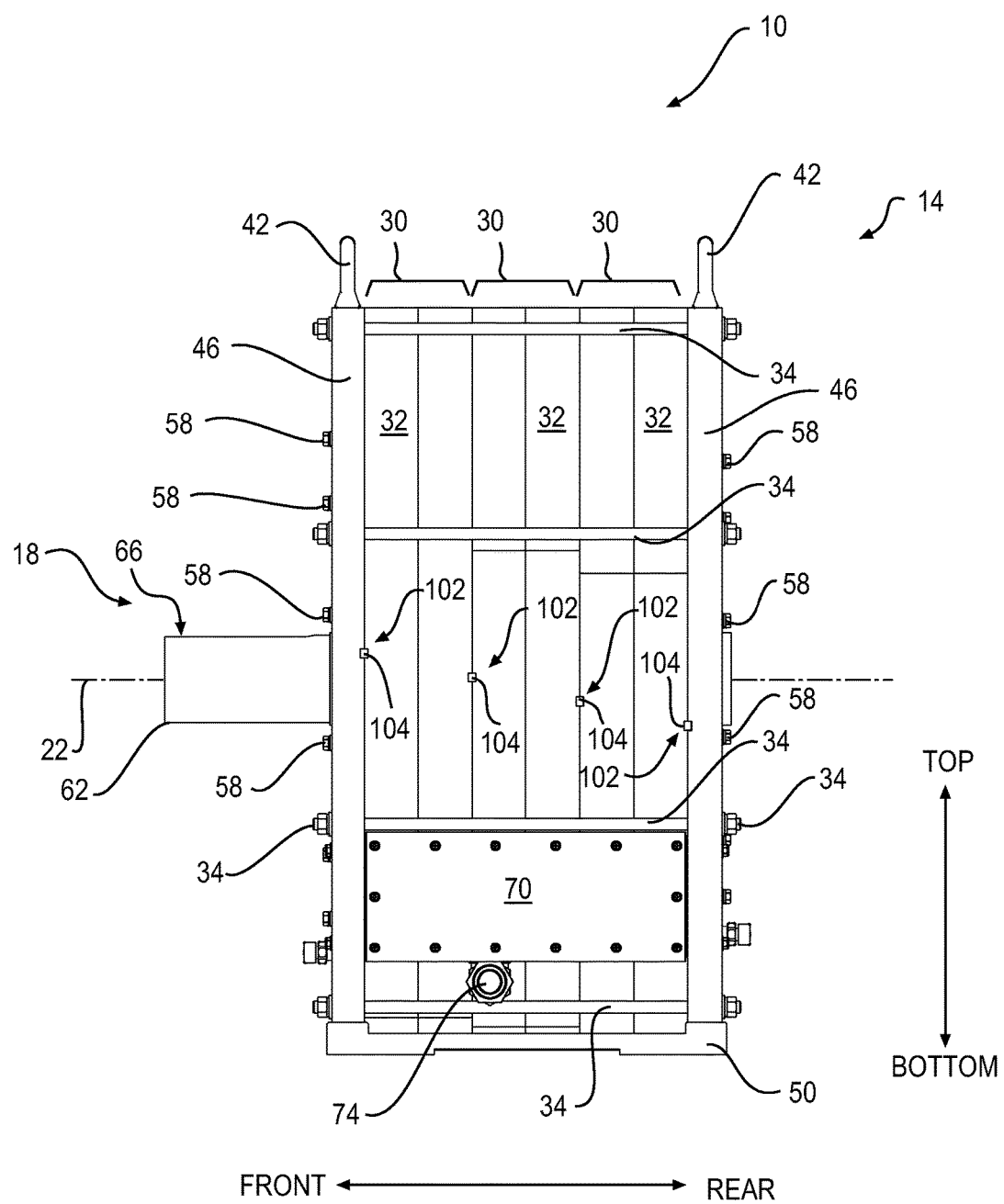
FIG. 3 is a right side elevational view of a TFEM in accordance with at least one embodiment of the invention.
Figure 4:
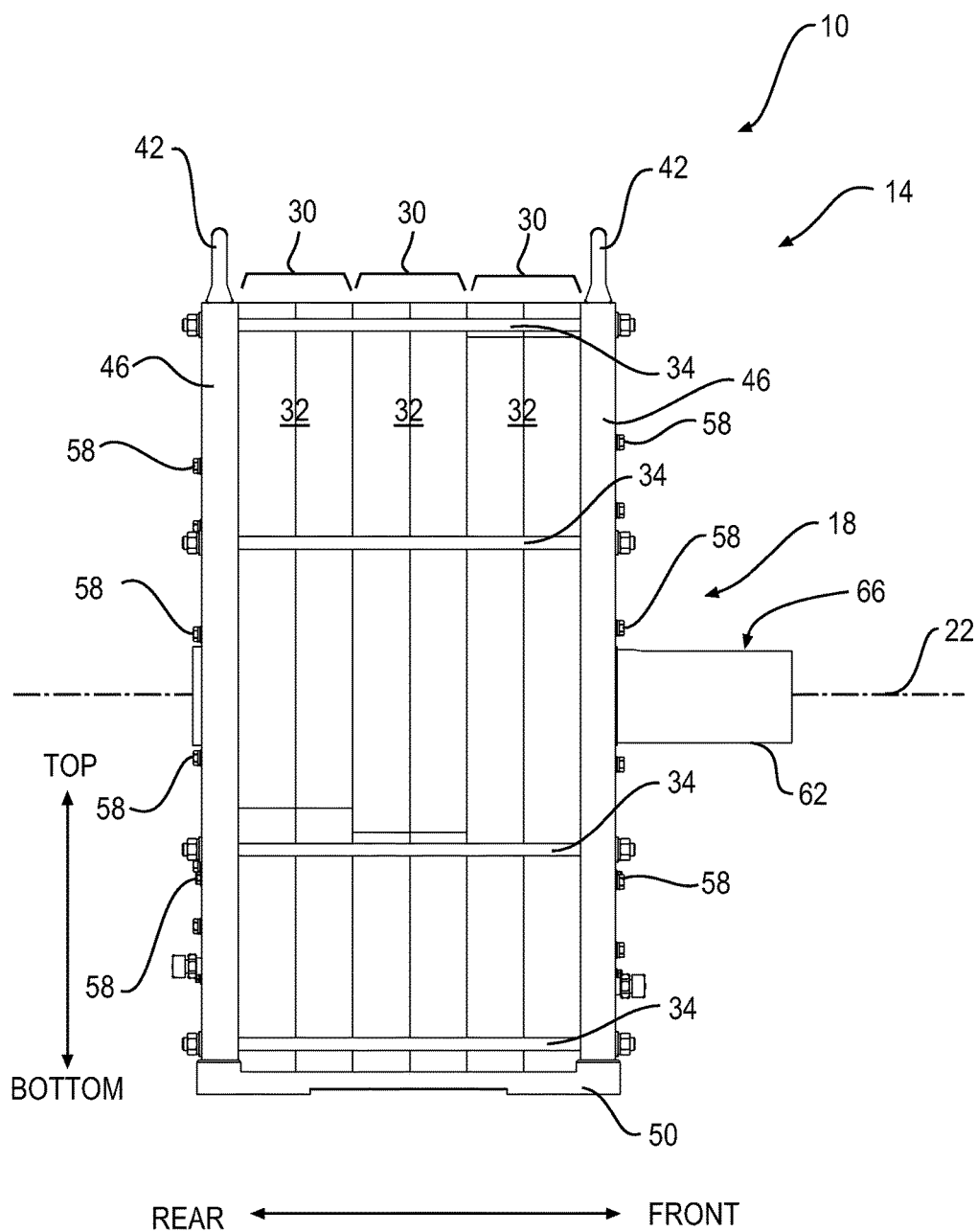
FIG. 4 is a left side elevational view of a TFEM in accordance with at least one embodiment of the invention.
Figure 5:
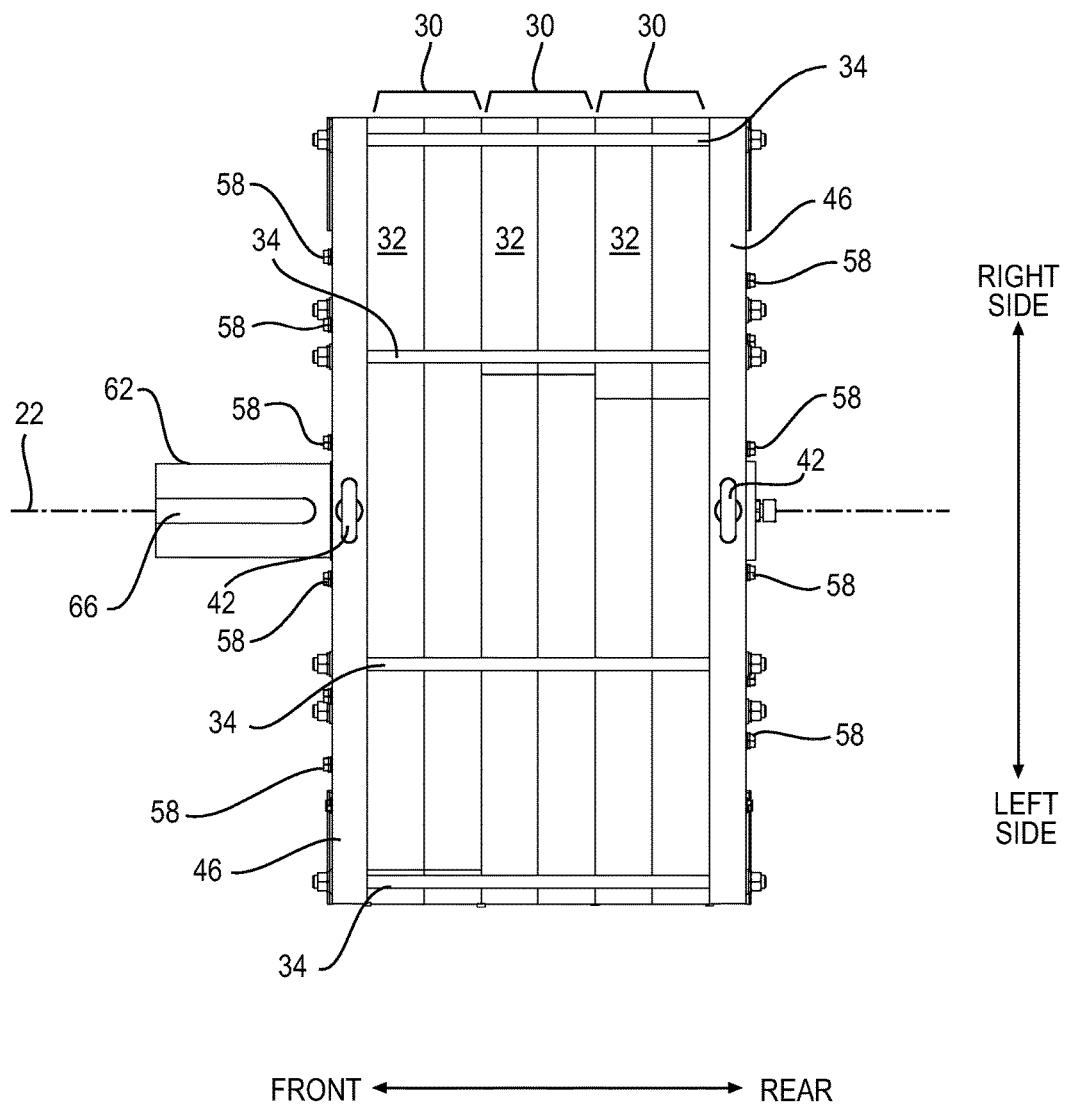
FIG. 5 is a top plan view of a TFEM in accordance with at least one embodiment of the invention.
Figure 6:
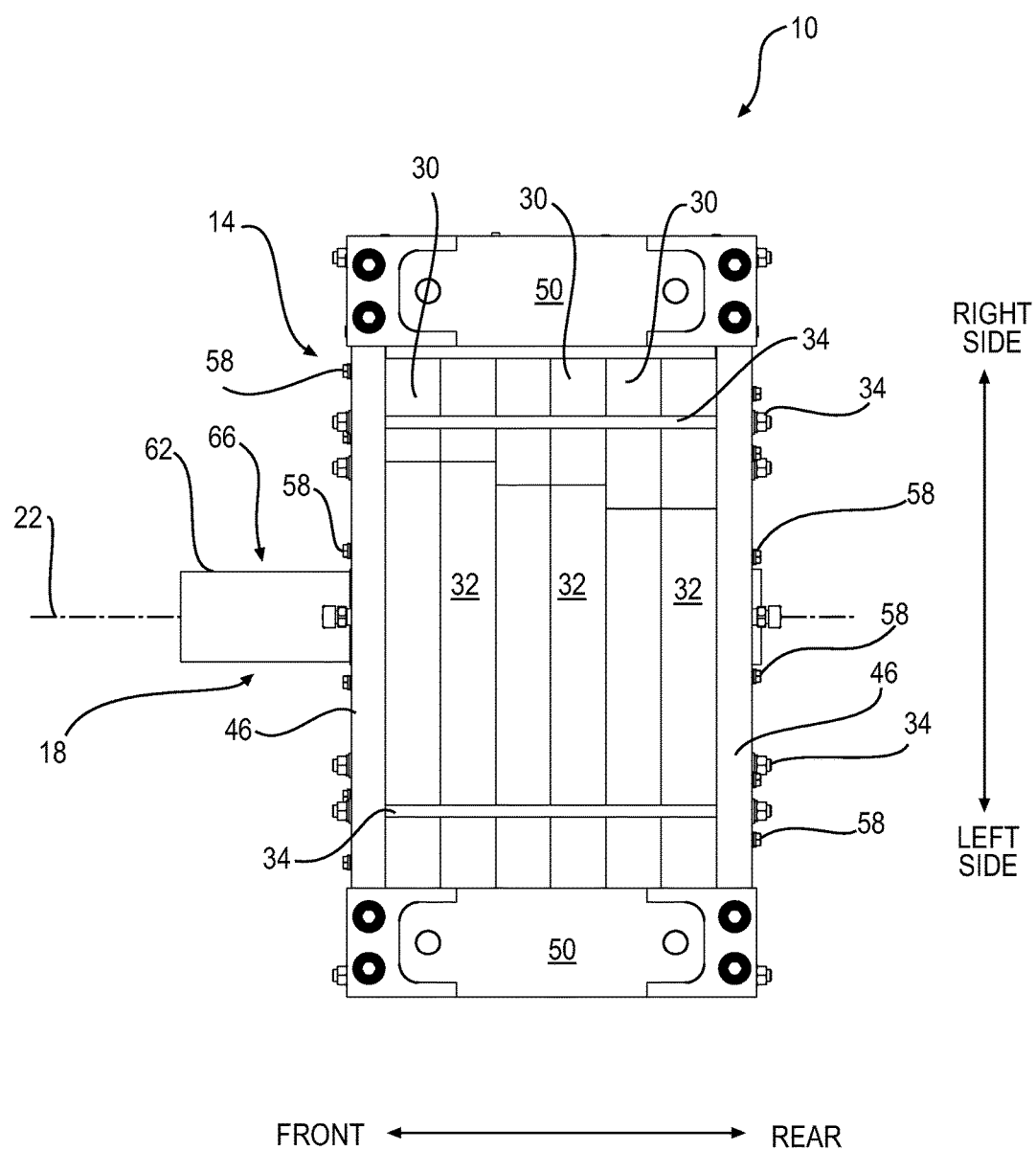
FIG. 6 is a bottom plan view of a TFEM in accordance with at least one embodiment of the invention.
Figure 7:
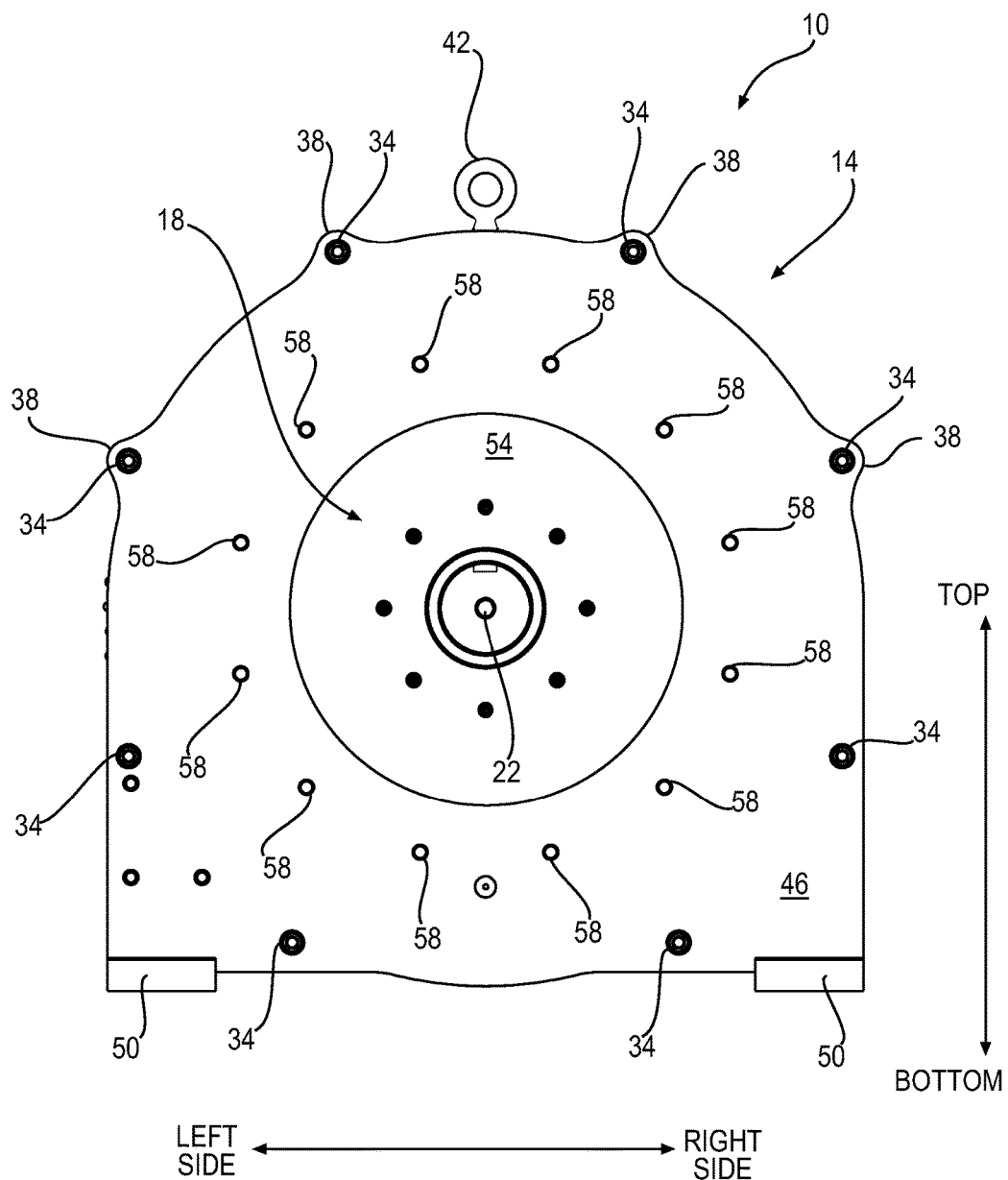
FIG. 7 is a front elevational view of a TFEM in accordance with at least one embodiment of the invention.
Figure 8:
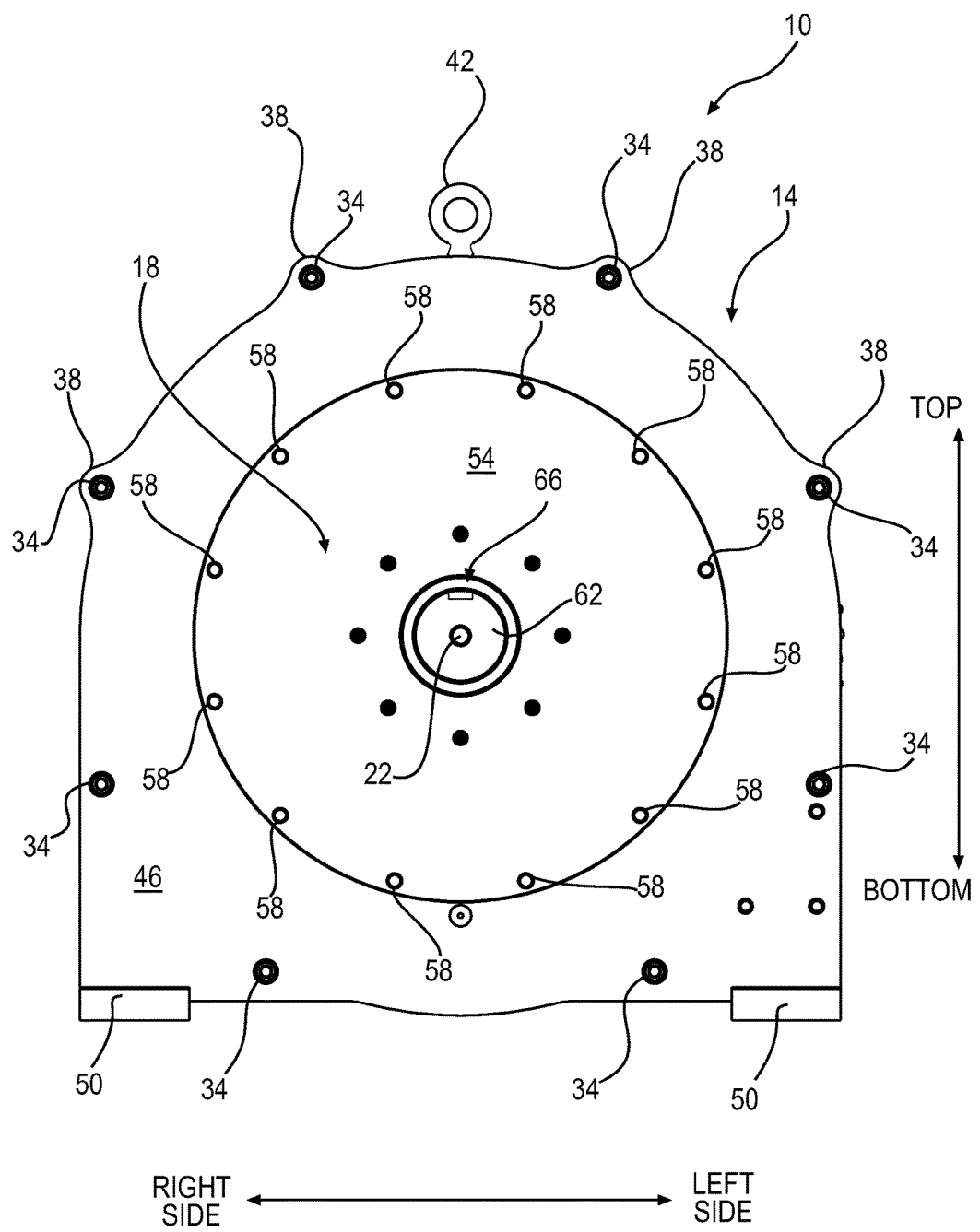
FIG. 8 is a rear elevational view of a TFEM in accordance with at least one embodiment of the invention.

It is one aspect of the present invention to alleviate one or more of the shortcomings of background art by addressing one or more of the existing needs in the art.

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

An object of the invention is generally described as an electrical machine (rotatable or linear) adapted to minimize, reduce or cancels the cogging torque and the ripple torque in a transverse flux electrical machine.

Generally, an object of the present invention provides a Transverse Flux Electrical Machine (TFEM), which can also be more specifically appreciated as Transverse Flux Permanent Magnet (TFPM), that has reduced, or cancelled, cogging torque and ripple torque, collectively or separately. The reduction, or the cancellation, of the cogging torque and the ripple torque is made using a structure using various elements, namely: a number of pairs of poles, a magnetic length of the magnets, a coil length, a coil height, a magnet height, a rotor skew, a stator skew, a rotor overlap, a stator overlap and sets of poles.

Generally, an object of the invention provides a phase shift generally set at 120° electrical to provide standard symmetrical electric current overlapping over a complete 360° electrical cycle. The 120° phase shift allows to, in theory, eliminate harmonics that are not multiples of three (3). Therefore an object of the present invention provides an apparatus that substantially reduces harmonics that are multiples of three (3) in a three-phase transverse flux electrical machine. A two phases electrical machine would have a 90° phase shift and would use a similar logic.

One object of the invention provides a cores distribution in a phase that improves the torque waveform into a smoother, more sinusoidal, waveform.

At least one object of the invention provides at least one phase including a plurality of cores, and associated poles, angularly spaces apart from one another with different angular distances.

At lease one aspect of the invention provides at least one phase including at least three adjacent cores, and associated poles, angularly distanced apart with a substantially similar angular distance and further angularly spaced apart from adjacent cores, and associated poles, with a different angular distance.

At least one aspect of the invention provides at least two adjacent cores, and associated poles, angularly radially separated with an angle of 10.8° and angularly radially separated from adjacent cores with at least one significantly different angle.

At least one object of the invention provides a set of poles, and intervening angular distance therebetween, that is repeated at least two times in a phase to locate the poles in the phase.

At least one object of the invention provides a phase including a plurality of similar angular portions, each including a plurality of cores disposed therein with similar intervening angles thereof. Further, an aspect of the invention provides a phase including a plurality of assembled angular portions that respectively includes a repeated sequence of angular distances between the cores.

At least one aspect of the invention provides a phase including a plurality of identical angular portions thereof.

At least one object of the invention provides a TFEM that includes a stator skewing in respect with the rotation axis of the TFEM to reduce or cancel, collectively or separately, the cogging torque and the ripple torque of the TFEM.

At least one aspect of the invention provides a TFEM that includes a stator skewing of most preferably 6°.

At least one aspect of the invention provides a TFEM that includes a stator skewing of preferably between 4° and 8°.

At least one aspect of the invention provides a TFEM that includes a stator skewing of between 0° and 11°.

At least one object of the invention provides a TFEM that includes a rotor skewing in respect with the rotation axis of the TFEM to reduce or cancel, collectively or separately, the cogging torque and the ripple torque of the TFEM.

At least one aspect of the invention provides a TFEM that includes a rotor skewing of most preferably 0°.

At least one aspect of the invention provides a TFEM that includes a rotor skewing of preferably between 0° and 8°.

At least one aspect of the invention provides a TFEM that includes a rotor skewing of between 0° and 11°.

At least one object of the invention provides a TFEM that includes a number of pairs of poles that is a multiple of two (2), and desirably a multiple of four (4) to reduce or cancel, collectively or separately, the cogging torque and the ripple torque of the TFEM.

At least one aspect of the invention provides a TFEM that most preferably includes 32 pairs of poles per phase.

At least one aspect of the invention provides a TFEM that preferably includes between 28 and 36 pairs of poles per phase.

At least one aspect of the invention provides a TFEM that includes between 20 to 44 pairs of poles per phase.

At least one object of the invention provides a TFEM that includes a magnetic length that is proportionally used by other elements to reduce, or cancel, collectively or separately, the cogging torque and the ripple torque of the TFEM.

At least one aspect of the invention provides a TFEM that includes a magnetic length of most preferably 100 mm.

At least one aspect of the invention provides a TFEM that includes a magnetic length of most preferably between 60 mm and 150 mm.

At least one aspect of the invention provides a TFEM that includes a magnetic length of between 40 mm and 200 mm.

At least one object of the invention provides a TFEM that includes a coil length sized proportionally to the magnetic length to reduce or cancel, collectively or separately, the cogging torque and the ripple torque of the TFEM.

At least one aspect of the invention provides a TFEM that includes a coil length of most preferably 23% of the magnetic length.

At least one aspect of the invention provides a TFEM that includes a coil length of preferably between 20% and 25% of the magnetic length.

At least one aspect of the invention provides a TFEM that includes a coil length of between 11% and 33% of the magnetic length.

At least one object of the invention provides a TFEM that includes a coil height sized proportionally to the magnetic length to reduce or cancel, collectively or separately, the cogging torque and the ripple torque of the TFEM.

At least one aspect of the invention provides a TFEM that includes a coil height of most preferably 100% of the magnetic length.

At least one aspect of the invention provides a TFEM that includes a coil height of preferably between 70% and 120% of the magnetic length.

At least one aspect of the invention provides a TFEM that includes a coil height of between 40% and 150% of the magnetic length.

At least one object of the invention provides a TFEM that includes a magnet height sized proportionally to the magnetic length to reduce or cancel, collectively or separately, the cogging torque and the ripple torque of the TFEM.

At least one aspect of the invention provides a TFEM that includes a magnet height of most preferably 25% of the magnetic length.

At least one aspect of the invention provides a TFEM that includes a magnet height of preferably between 22% and 29% of the magnetic length.

At least one aspect of the invention provides a TFEM that includes a magnet height of between 17% and 33% of the magnetic length.

At least one object of the invention provides a TFEM that includes a rotor overlap to reduce or cancel, collectively or separately, the cogging torque and the ripple torque of the TFEM.

At least one aspect of the invention provides a TFEM that includes a rotor overlap of most preferably 0%.

At least one aspect of the invention provides a TFEM that includes a rotor overlap of preferably between 0% and 8%.

At least one aspect of the invention provides a TFEM that includes a rotor overlap of between −10% and 35%.

At least one object of the invention provides a TFEM that includes a stator overlap to reduce or cancel, collectively or separately, the cogging torque and the ripple torque of the transverse flux electrical machine.

At least one aspect of the invention provides a TFPM that includes a stator overlap of most preferably 20%.

At least one aspect of the invention provides a TFEM that includes a stator overlap of preferably between 0% and 25%.

At least one aspect of the invention provides a TFEM that includes a stator overlap of between −5% and 30%.

At least one object of the invention provides a TFEM that includes a diameter at the air gap that is material to reduce or cancel, collectively or separately, the cogging torque and the ripple torque of the TFEM.

At least one aspect of the invention provides a TFEM that includes a diameter at the air gap of most preferably 510 mm.

At least one aspect of the invention provides a TFEM that includes a diameter at the air gap of preferably between 200 mm and 2200 mm.

At least one aspect of the invention provides a TFEM that includes a diameter at the air gap of between 100 mm and 4000 mm.

At least one object of the invention provides a TFEM that includes a rotor portion that has a symmetrical layout of magnets and concentrators affixed thereon.

At least one object of the invention provides a TFEM that includes a stator portion that has a non-symmetrical layout of cores secured therein.

At least one object of the invention provides a rotatable transverse flux electrical machine (TFEM) comprising a stator portion; and a rotor portion rotatably located in respect with the stator portion, the rotor portion including an alternate sequence of magnets and concentrators radially disposed about a rotation axis thereof; the stator portion including at least one phase, the at least one phase including a plurality of cores cooperating with a coil disposed about the rotation axis, each core including a skewed pair of poles to progressively electromagnetically engage an electromagnetic field of respective cooperating concentrators.

At least one object of the invention provides a rotatable transverse flux electrical machine (TFEM) kit comprising a stator portion; and a rotor portion adapted to be rotatably located in respect with the stator portion to allow magnets, concentrators and coils cooperation, the rotor portion including an alternate sequence of magnets and concentrators radially disposed about a rotation axis thereof, the stator portion including at least one phase, the at least one phase including a plurality of cores cooperating with a coil disposed about the rotation axis, each core including a skewed pair of poles to progressively electromagnetically engage an electromagnetic field of respective cooperating concentrators.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

DESCRIPTION OF EMBODIMENT(S) OF THE INVENTION

Our work is now described with reference to the Figures. In the following description, for purposes of explanation, numerous specific details are set forth in order to provide a thorough understanding of the present invention by way of embodiment(s). It may be evident, however, that the present invention may be practiced without these specific details. In other instances, when applicable, well-known structures and devices are shown in block diagram form in order to facilitate describing the present invention.

The embodiments illustrated below depict a TFEM 10 with thirty-two (32) poles and a 510 mm diameter at the air gap and a 100 mm length of the magnets. The configuration of the TFEM 10, an external rotor instead of an internal rotor, the number of phases can change in accordance with the desired power output, toque and rotational speed without departing from the scope of the present invention.

A TFEM 10 is illustrated in FIG. 1 through FIG. 8. The TFEM 10 includes a stator portion 14 and a rotor portion 18. The stator portion 14 is adapted to remain fixed while the rotor portion 18 is located within the stator portion 14 and is adapted to rotate in respect with the stator portion 14 about rotation axis 22. The TFEM of the illustrated embodiments has a modular construction. Two axial side members 26 are secured together to assemble three electrical phases 30 together, each being provided by a phase module 32. Each phase module 32 is adapted to individually provide an electrical phase 30 of alternating current. The present embodiment illustrates three phases 30 axially coupled together to provide tri-phased current when the TFEM 10 is rotatably actuated. The pair of axial side members 26 interconnects and axially secures together the three phases 30. Proper tension is applied to each of the plurality of axial securing members 34 to ensure the phase modules 32 remain fixedly secured together. In the present embodiment, each axial side member 26 is provided with a series of extending axial securing member receiving portions 38 adapted to receive the axial securing members 34 therein while the axial securing members 34 extends axially outside the phase modules 32. The axial securing members 34 could alternatively pass through the phase modules 32 in another unillustrated embodiment.

Still referring to FIG. 1 through FIG. 8, the axial side members 26 can be made of steel or other suitable material providing sufficient mechanical strength for the required purpose. Each axial side members 26 is optionally provided with a lifting link 42 sized and designed to receive therein, for example, a crane hook (not illustrated) to lift and move the TFEM 10. The axial side members 26 are further equipped with a support portion 46 adapted to secured thereto a pair of feet 50 configured to interconnect both axial side members 26 together and to further facilitate securing the TFEM 10 to a base chassis (not illustrated). For instance, the base chassis can be a nacelle when the TFEM 10 is installed in a windmill or alternatively any other chassis provided by the equipment the TFEM 10 is operatively connected to.

Each axial side member 26 is configured to receive and secure thereto an axial rotor support member 54. The axial rotor support member 54 is recessed in a circular cavity 56 (visible in FIG. 9) defined in its associated axial side member 26 to concentrically locate the rotor portion 18 in respect with the stator portion 14. The axial rotor support member 54 is further removably secured to its associated axial side member 26 with a plurality of fasteners 58. The actual configuration of the embodiment illustrated in FIG. 9 allows removal of the rotor portion 18 in one axial direction 60 when both axial rotor support members 54 are unsecured from their respective axial side member 26 because the circular cavities 56 are both located on the same side of their respective axial side member 26. This allows for easy maintenance of the TFEM 10 once installed in its operating configuration with its external mechanism.

As it is also possible to appreciate from the embodiment illustrated in FIGS. 1 through 8, the rotor portion 18 extends through the axial rotor support members 54 and rotatably engages both axial rotor support member 54. A solid rotor drive member 62 further extends from one axial rotor support members 54. The solid drive member 62 could alternatively be a hollowed drive member in another unillustrated embodiment. The drive member 62 is adapted to transmit rotatable motive power from an external mechanism (not illustrated) to the TFEM 10 and includes a drive securing mechanism 66 adapted to rotatably couple the drive member 62 of the TFEM 10 to a corresponding rotatable drive element from the external mechanism (not illustrated). The external mechanism (not illustrated) could, for example, be a windmill rotatable hub (not illustrated) to which the rotor blades (not illustrated) are secured to transmit rotational motive power to the TFEM 10. The external mechanism expressed above is a non-limitative example and other external mechanisms adapted to transmit rotational motive power to the TFEM 10 are considered to remain within the scope of the present application.

The TFEM 10 is further equipped with a protective plate 70 adapted to store and protect electrical connectors and electrical wires that extends from the TFEM 10 through an electrical outlet 74.

Figure 9:
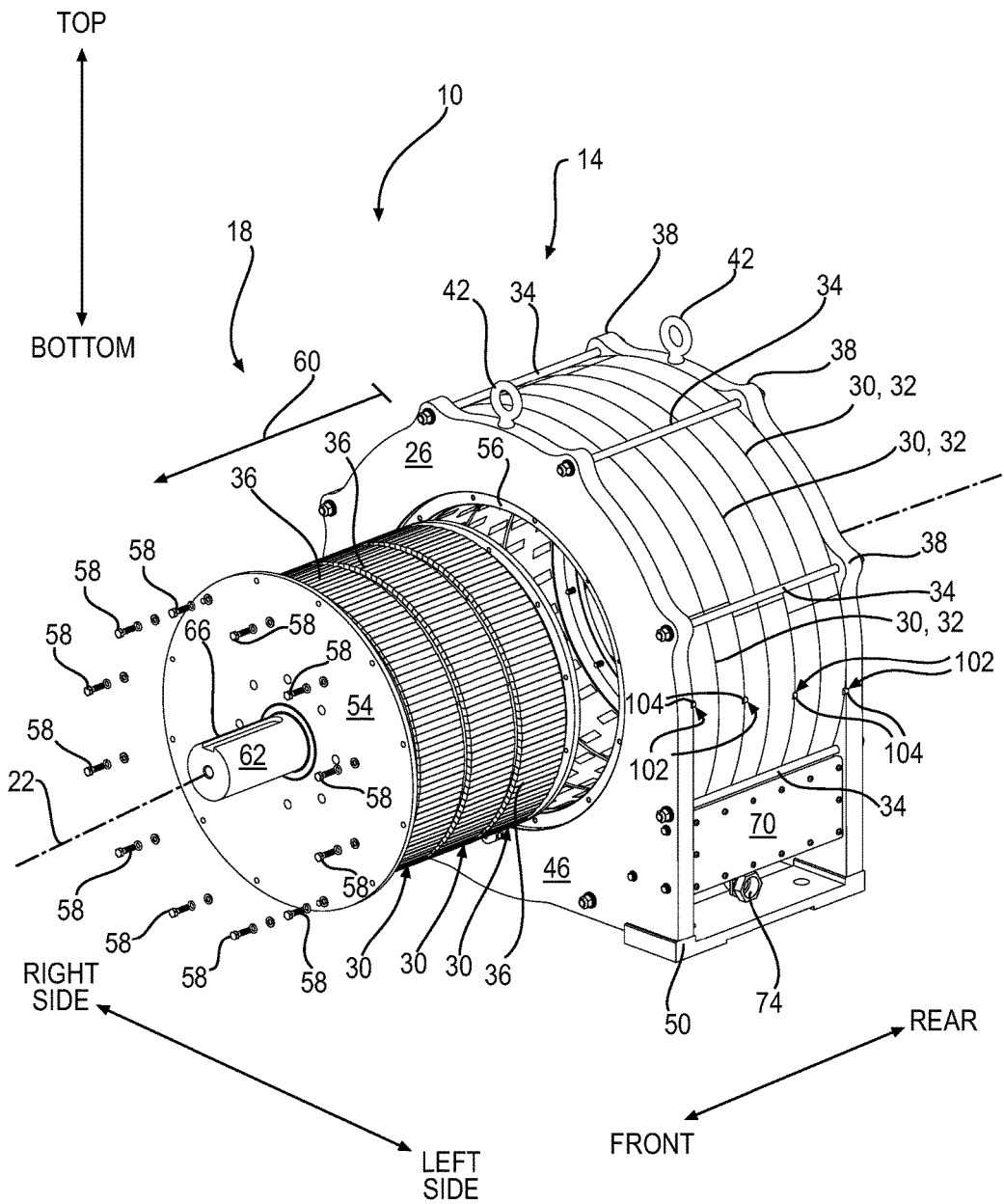
FIG. 9 is an isometric semi-exploded view of a TFEM illustrating a stator portion and a rotor portion in accordance with at least one embodiment of the invention.

Turning now to FIG. 9 illustrating a semi-exploded TFEM 10 where a skilled reader can appreciate the depicted rotor portion 18 is axially extracted 60 from the stator portion 14. The rotor portion 18 is axially extracted 60 from the stator portion 14 by removing the plurality of fasteners 58 and unsecuring the axial rotor support members 54 from their respective associated axial side member 26. It can be appreciated that the rotor portion 18 of the exemplary embodiment has three distinct modular phases 36, each providing an electrical phase 30, adapted to axially align and operatively cooperate with the three phase modules 32 of the exemplified stator portion 14.

Figure 10:
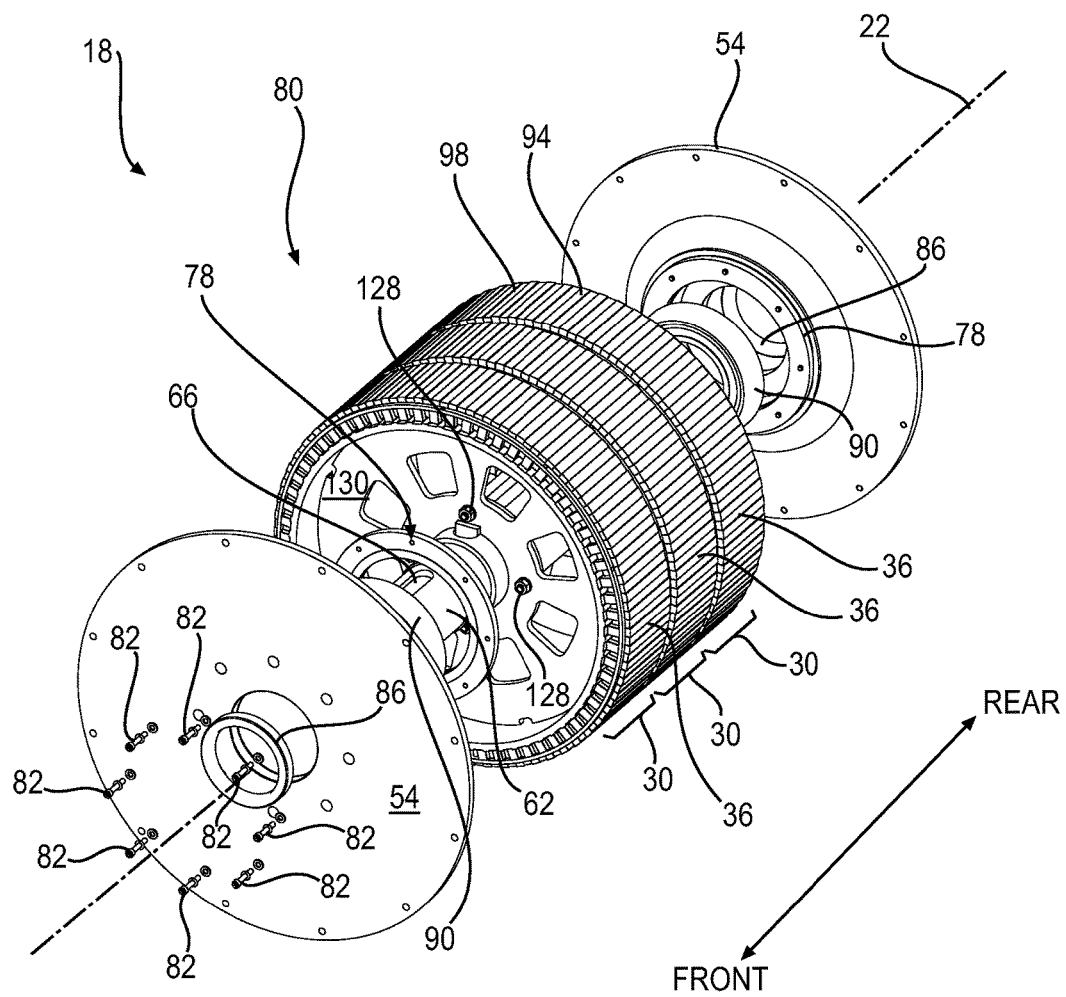
FIG. 10 is an isometric semi-exploded view of a portion of a TFEM illustrating a rotor portion in accordance with at least one embodiment of the invention.

FIG. 10 illustrates a further exploded view of the rotor portion 18. As indicated above, the rotor portion 18 is adapted to rotate in respect with the stator portion 14. The speed of rotation can differ depending of the intended purpose. Power remains function of the torque and the rotation speed of the rotor portion 18 therefore the TFEM is going to produce more power if the TFEM rotates rapidly as long as its operating temperature remains in the operating range of its different parts to prevent any deterioration (e.g. magnet demagnetization or insulating vanish deterioration, to name a few. The axial rotor support members 54 are adapted to be unsecured from the bearing holder 78 by removing the plurality of fasteners 82. A sequence of assembled seal 86, bearing 90 and bearing holder 78 is used on the front side of the rotor portion 18 while the same type of assembly is used on the opposite axial side of the rotor portion 18 to rotatably secure the rotor 80 to the axial rotor support members 54. FIG. 10 also illustrates that each phase module 36 of the rotor 80 uses a sequence of alternating permanent magnets 94 and concentrators 98. Strong permanent magnets 94 can be made of Nb—Fe—B as offered by Hitachi Metals Ltd and NEOMAX Co. Ltd. Alternatively, suitable magnets can be obtained by Magnequench Inc. and part of this technology can be appreciated in U.S. Pat. No. 5,411,608, U.S. Pat. No. 5,645,651, U.S. Pat. No. 6,183,572, U.S. Pat. No. 6,478,890, U.S. Pat. No. 6,979,409 and U.S. Pat. No. 7,144,463.

Figure 11:
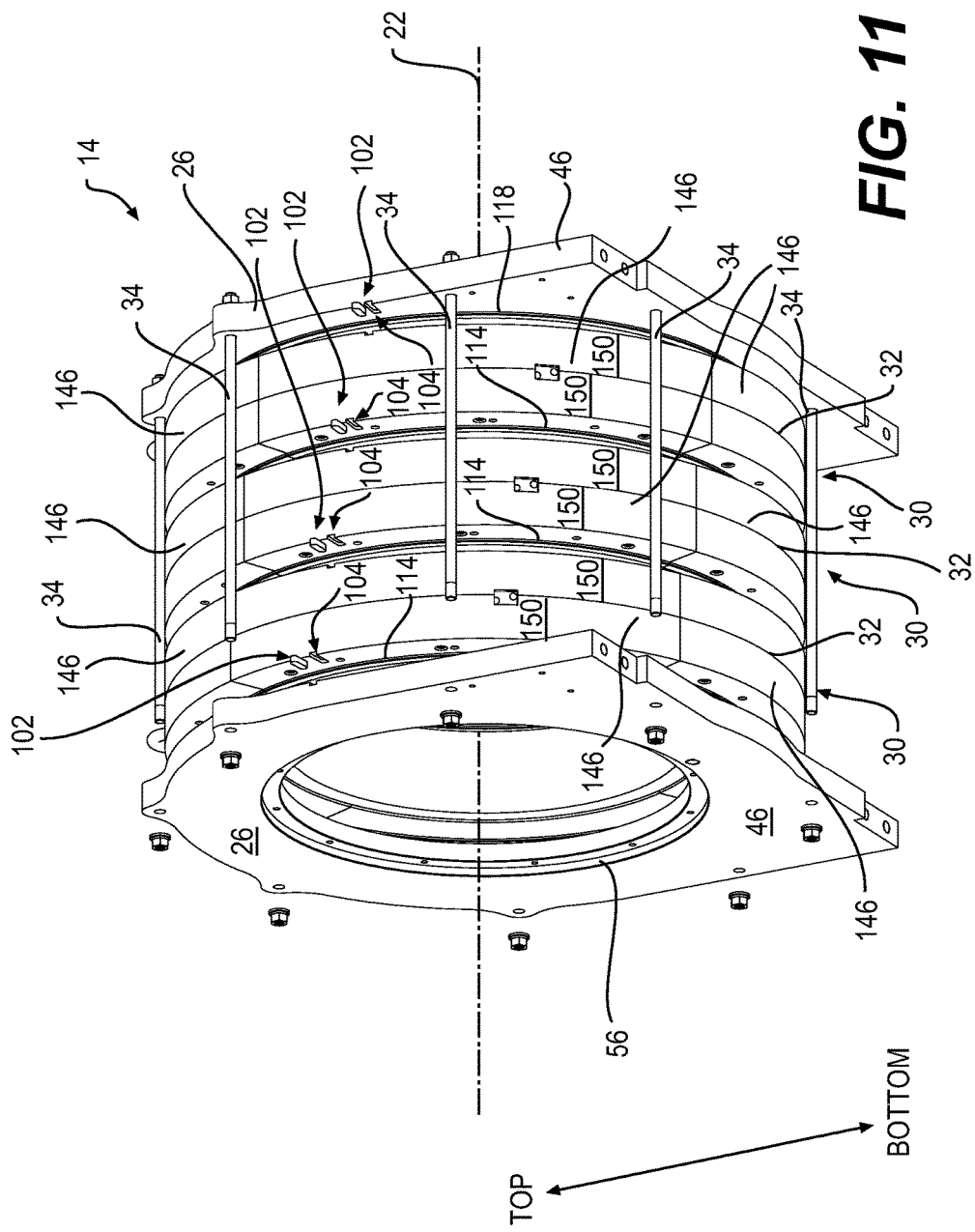
FIG. 11 is an isometric semi-exploded view of a TFEM illustrating multiple phase modules of a stator portion in accordance with at least one embodiment of the invention.

A semi-exploded stator portion 14 is illustrated in FIG. 11. The axial side members 26 are exploded from the illustrative three (3) phase modules 32. Each phase module 32 is going to be discussed in more details below. However, a positioning mechanism 102 is provided to polarly locate each phase module 32 in respect with its adjacent phase module 32 so that proper phase shift is maintained. Generally, the phase shift is set at 120° electrical to provide standard symmetrical electric current overlapping over a complete 360° electrical cycle. The 120° phase shift allows to, in theory, eliminate harmonics that are not multiples of three (3). The 120° phase shift illustrated herein is a preferred embodiment and is not intended to limit the angular phase shift of the present invention.

The illustrative embodiment of FIG. 11 includes three (3) phase modules 32. Another possible embodiment includes a multiple of three (3) phases modules 32 mechanically secured together, like the three (3) phase modules of FIG. 11, and electrically connected by phase 30 to increase the capacity of the TFEM 10 by simply increasing the axial length of the TFEM 10. Thus, a nine (9) phase modules 32 would be coupled three-by-three for a three-phased 30 TFEM 10. Another embodiment is a one-phase 30 TFEM 10 including only one phase module 32. One other embodiment could be a two-phased 30 TFEM 10 electrically coupled together in a one-phase 30 configuration and with a phase shift of 90° in a two-phase 30 configuration.

Figure 12:
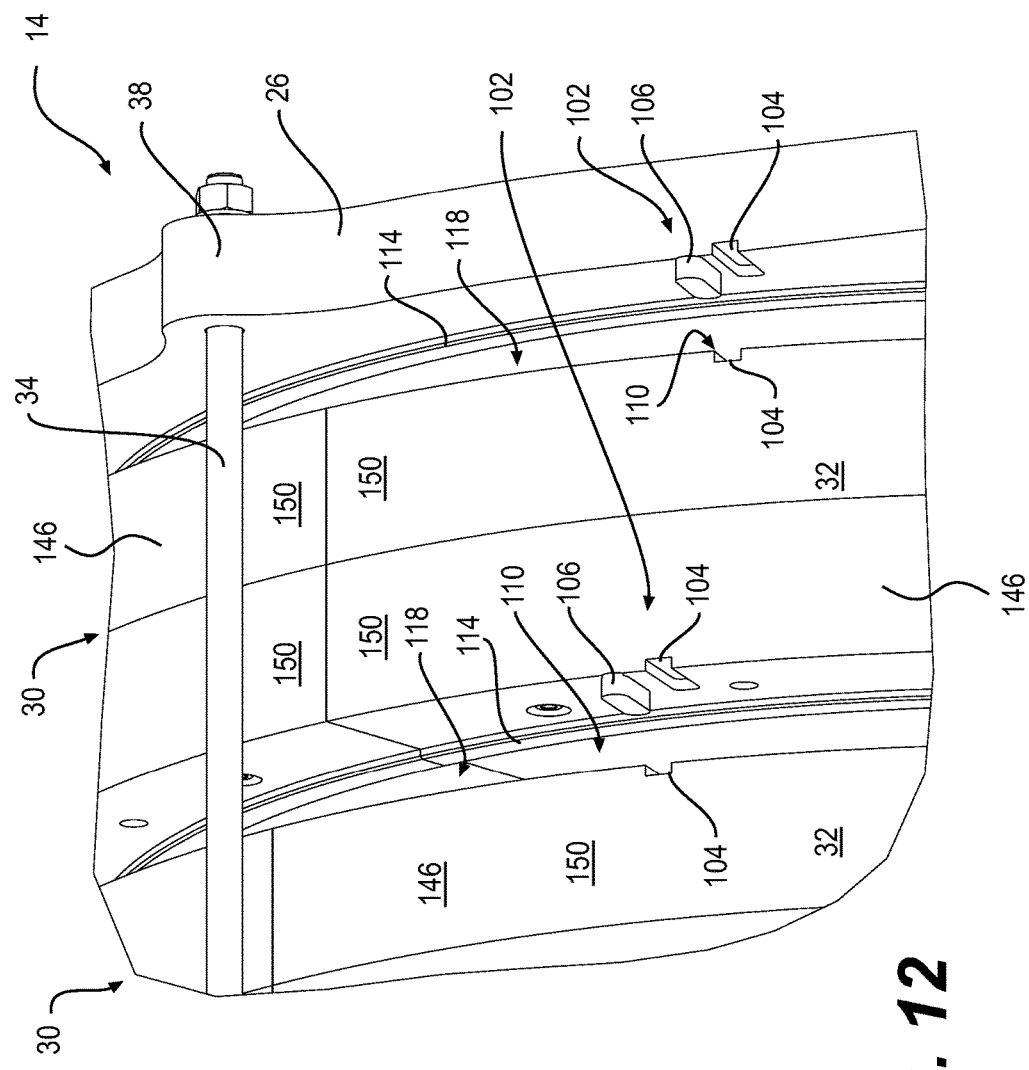
FIG. 12 is a magnified section of an isometric semi-exploded view of a TFEM in accordance with at least one embodiment of the invention.

As best seen from FIG. 12, each positioning mechanism 102 is embodied as a protruding portion 106 and corresponding cavity 110 sized and designed to mate together to polarly locate two adjacent phase modules 32 together. Additionally, each phase module 32 further includes a circular ridge 114 on one axial side and corresponding circular groove 118 on the opposite axis side. Engagement of the circular ridge 114 and circular groove 118 ensures concentric positioning of adjacent phase modules 32 along the rotation axis 22 of the TFEM 10. Other shapes, designs and/or mechanical elements suitable to locate the phase modules 32 and the axial side members 26 together could be used without departing from the scope of the present application. Additionally, the recessed portion 104 is further defined in the phase modules 32 and the axial side members 26 to facilitate separation of adjacent assembled phase modules 30 and cooperating axial side members 26 by inserting a tool therein and prying to separate the two adjacent phase modules 32.

Figure 13:
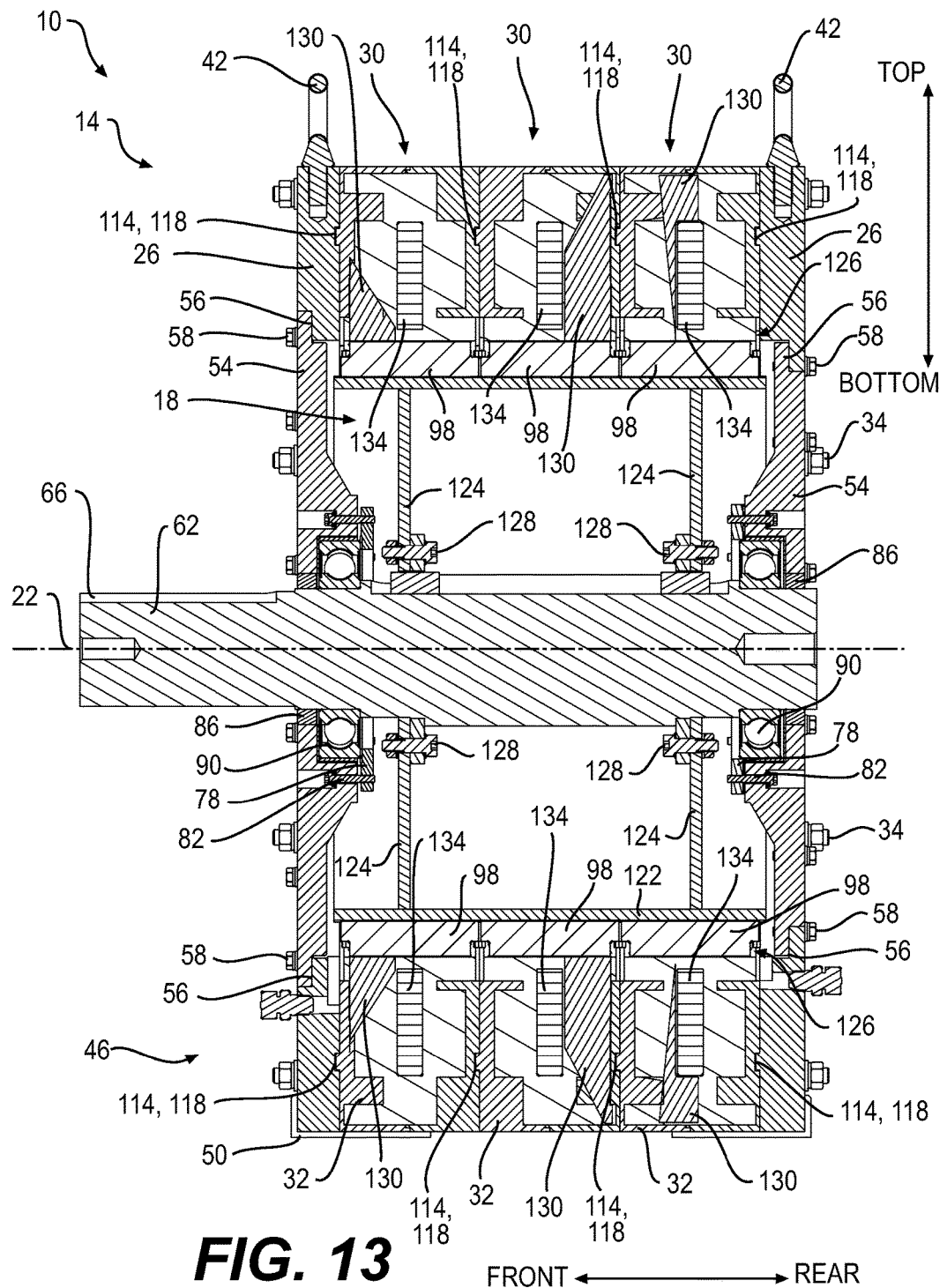
FIG. 13 is a section view of a TFEM illustrating multiple phase modules in accordance with at least one embodiment of the invention.

A section view of the TFEM 10 is illustrated in FIG. 13. The rotor portion 18 includes a cylindrical frame 122 preferably removably secured to the rotatable drive member 62 with a series of fasteners 128 via two plates 124 radially extending from the drive member 62. As explained above, the cylindrical frame 122 is sized and designed to accommodate three electrical phases 30, each provided by a phase module 36 including its alternate series of magnets 94 and concentrators 98 secured thereon. The circular stator portion 14 and the circular rotor portion 18 are separated by an air space called "air gap" 126 that allows an interference-free rotation of the rotor portion 18 with respect to the stator portion 14. The smallest is the air gap 126 the most performance the TFEM is going to have (although cogging torque is going to likely be increased). Air gap 126 is however limited by mechanical interferences between the stator portion 14 and the rotor portion 18 and is also going to be influenced by manufacturing and assembly tolerances in addition to thermic expansion of the parts when the TFEM is actuated. The stator portion 14 comprises soft iron cores (cores) 130 that direct the magnetic flux in a direction that is mainly perpendicular to the direction of rotation of the rotor portion 18. The stator portion 14 of TFEM 10 also comprises in each phase module 32 electrical conductors defining a toroid coil 134 that is coiled in a direction that is parallel to the direction of rotation of the TFEM 10. In this embodiment, the rotor portion 18 comprises a plurality of identical permanent magnets 94, which are disposed so as to create an alternated magnetic flux in the direction of the air gap 126. This magnetic flux goes through the air gap 126 with a radial orientation and penetrates the soft iron cores 130 of the stator portion 14, which directs this magnetic flux around the toroid coil 134.

In the TFEM 10 of the type comprising a rotor portion 18 including a plurality of identical permanent magnets 94 and of magnetic flux concentrators 98, the permanent magnets 94 are oriented in such a manner that their magnetization direction is parallel to the direction of rotation of the rotor portion 18, along rotation axis 22. Magnetic flux concentrators 98 are disposed between the permanent magnets 94 and redirect the magnetic flux produced by the permanent magnets 94 radially towards the air gap 126. In contrast, the stator portion 14 comprises "horseshoe-shaped" soft iron cores 130, which are oriented in such a manner that the magnetic flux that circulates inside these cores 130 is directed in a direction that is mainly parallel to the direction of rotation of the rotor portion 18. The perpendicular orientation of the magnetic flux in the cores 130 of the stator portion 14, with respect to the rotation direction, gives to TFEM a high ratio of mechanical torque per weight unit of the electrical machine.

Figure 14:
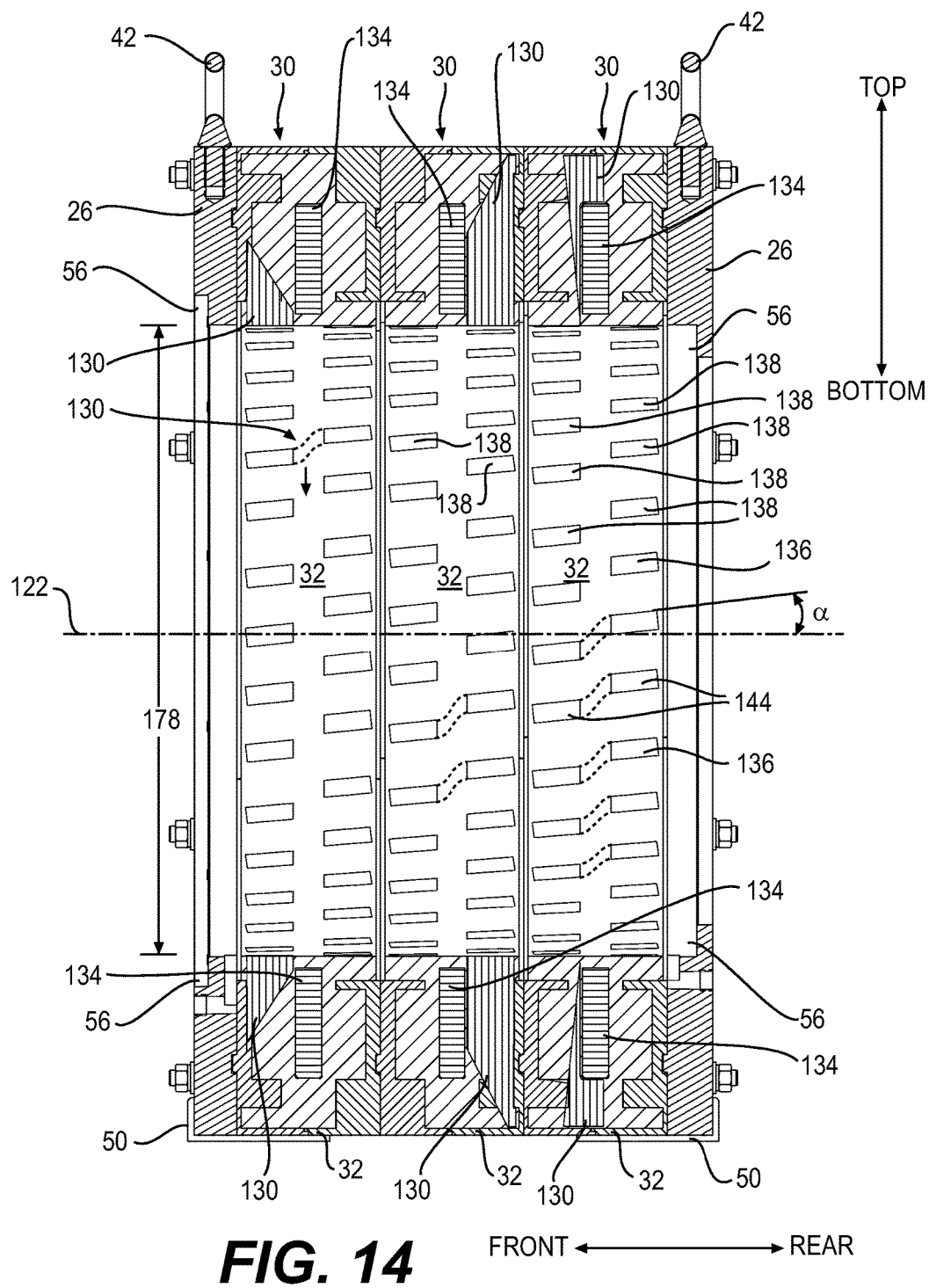
FIG. 14 is a section view of a TFEM illustrating cores pairs in a stator portion in accordance with at least one embodiment of the invention.
Figure 15:
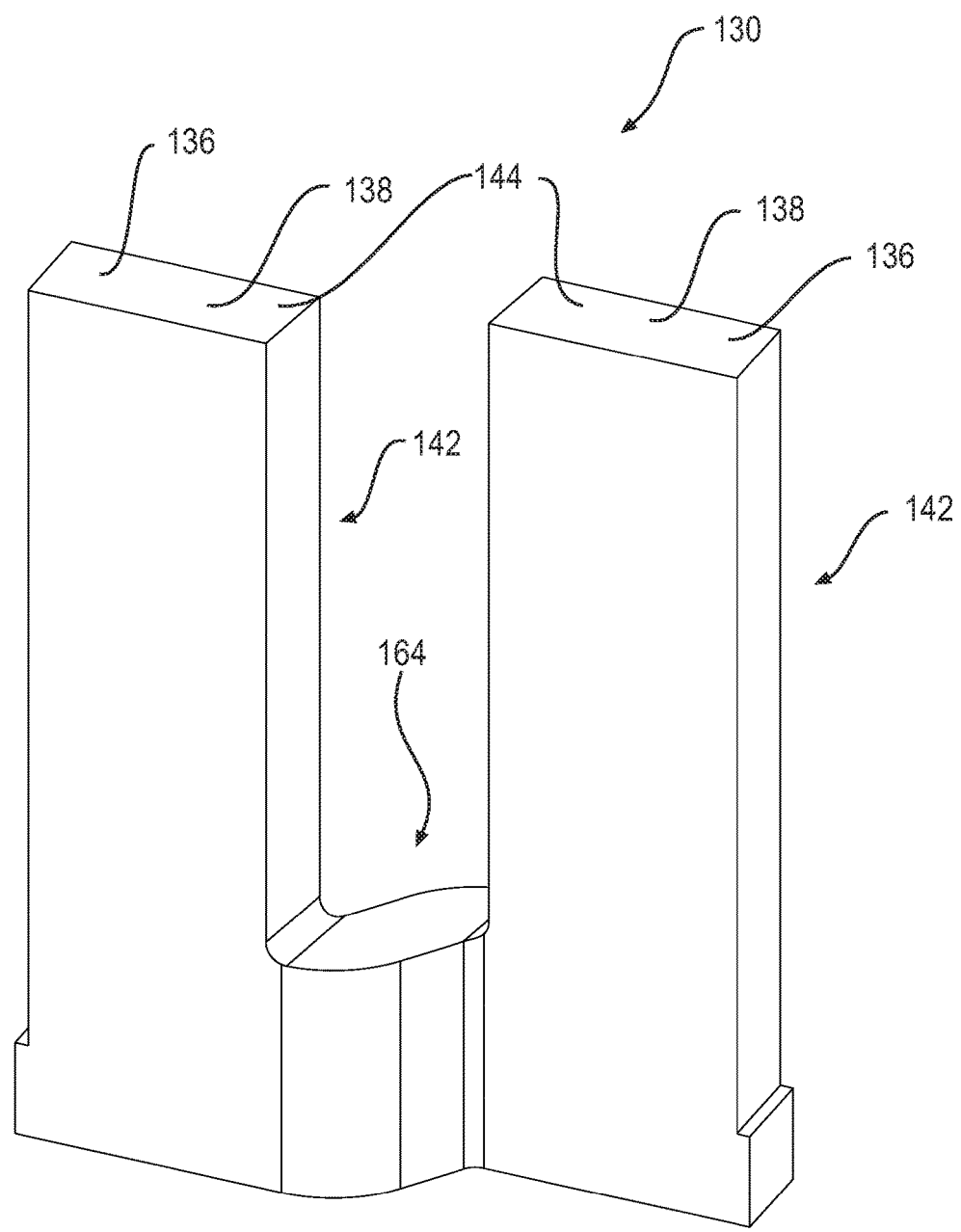
FIG. 15 an isometric view of a core in accordance with at least one embodiment of the invention.

The rotor portion 18 has been removed in FIG. 14 illustrating an encumbrance-free section view of the stator portion 14. One can appreciate a plurality of pole faces 138 extending from each core's 130 legs 142. The core's 130 legs 142 are interconnected with an intermediate core portion 164 (as best seen in FIG. 15). The pole faces 138 are disposed at an angle α from the rotation axis 22 of the TFEM 10. The angle α of the pole faces 138 is called stator skew and is one of a plurality of elements that can be acted upon to reduce or cancel the ripple torque and the cogging torque. The elements used to reduce or cancel the ripple torque and the cogging torque are listed below:

TABLE 1

| Reference | Name | Description | Unit |
|---|---|---|---|
| α | Stator skew | The pole faces 138 of the cores 130 legs are disposed at an angle α from the rotation axis 22 of the TFEM 10. | Degree (°) |
| β | Rotor skew | Axial angle between the longitudinal axis of the magnets 94 layout on the rotor portion 18 in respect with the rotation axis 22 of the TFEM 10. | Degree (°) |
| n | Number of pairs of poles | Number of pole faces pairs of the core 130 in the stator portion 14 extending toward the rotation axis 22. Each core 130 has two (2) poles extending thereof. The poles number is twice the number of pairs of poles. | Integer (#) |
| 162 | Magnetic length | Axial length of magnets on the rotor portion 18. | Millimeter (mm) |
| 166 | Coil length | Axial length of the coil 134. | Millimeter (mm) |
| 170 | Coil height | Radial height of the coil 134. | Millimeter (mm) |
| 174 | Magnet height | Radial height of the magnet 94. | Millimeter (mm) |
| 186 | Rotor overlap | Overlapping of concentrators 98 in respect with their "normal" size corresponding to ¼ of a pole pitch. The pole pitch is the angular width of two magnets 94 in addition to the angular width of two concentrators 98. A positive overlap implies fewer magnets 94. | Percent (%) |
| 202 | Stator overlap | Overlapping of core 130 in respect with their "normal" size corresponding to ¼ of a pole pitch. The pole pitch is the angular width of two magnets 94 in addition to the angular width of two concentrators 98. A positive overlap implies a ticker core 130. | Percent (%) |
| 178 | Diameter at the air gap | This is the measured diameter of the TFEM 10 from one air gap 126 to the opposite air gap 126 when the measure is made through the rotation axis 22 of the TFEM 10. | Millimeter (mm) |

Focusing on the stator skew element, in reference with FIG. 14 through FIG. 18, a plurality of cores 130 are disposed in each phase module 32 of the stator portion 14. Each core 130 includes a pair of poles 144 (one pair of poles=n=1) extending from respective core's legs 142 (not visible in FIG. 14). Each pole 130 ends with respective pole faces 138 that can be seen inside the stator module 14 illustrated in FIG. 14. The skewed pole faces 138 of an embodiment are a projection toward the rotation axis 22 of the angle of the core's legs 142. Each pair of pole faces 138 can be skewed, or angled, to more or less progressively engage the electromagnetism of the magnets 94 and the concentrators 98 on the rotor portion 18, on the other side of the air gap 126, when the rotor portion 18 is operatively assembled with the stator portion 14. The angle α of the pole faces 138 of the illustrated embodiment is provided by the angle of the core's legs 142 that is dictated by the design and the shape of the core-receiving spaces 140 in the phase module 32 assembly as illustratively embodied in FIG. 16 and FIG. 17.

Figure 16:
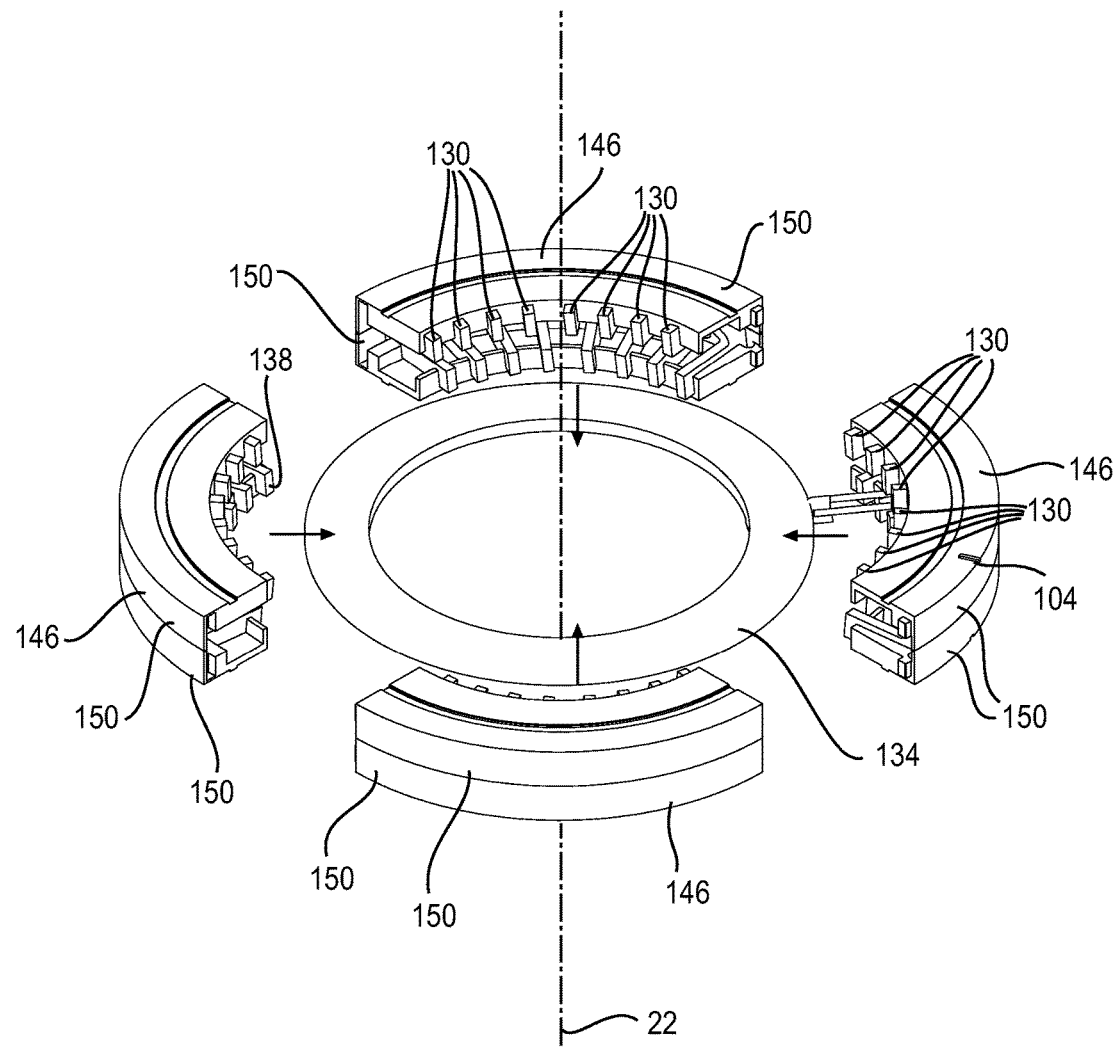
FIG. 16 an isometric semi-exploded view of a phase module of a stator portion in accordance with at least one embodiment of the invention.
Figure 17:
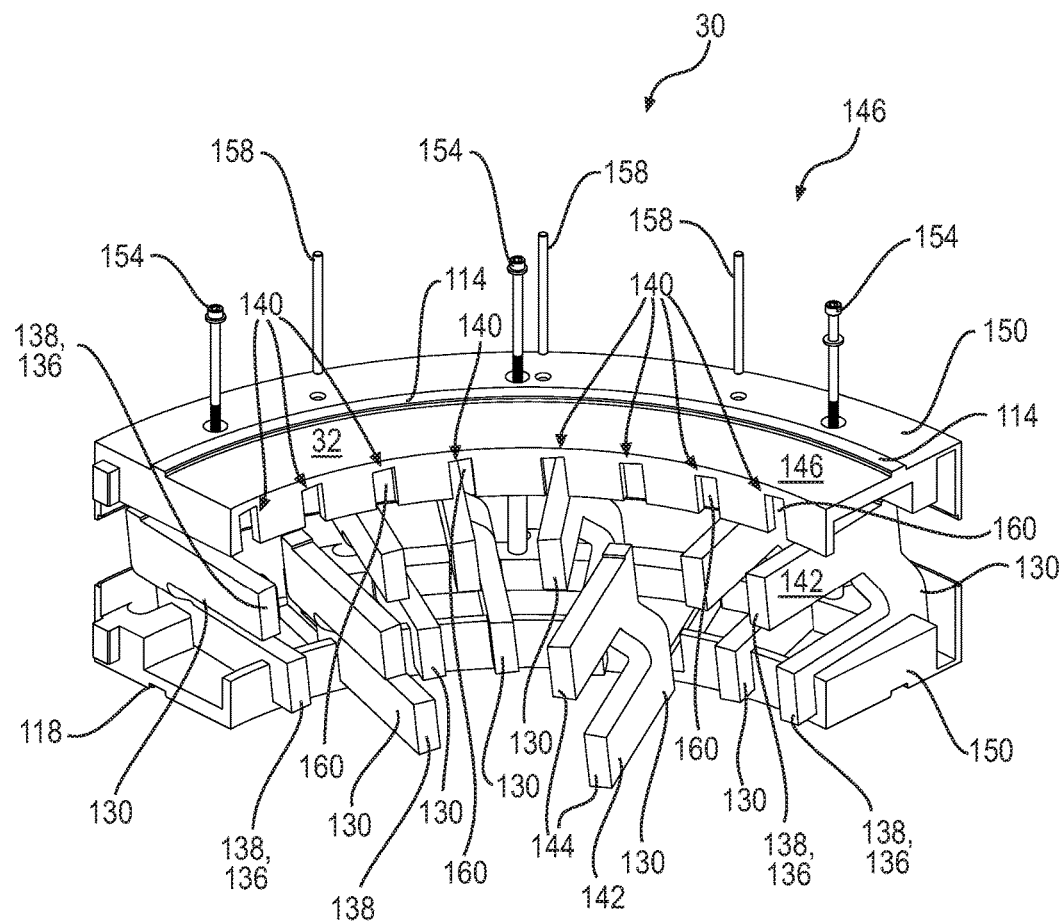
FIG. 17 an isometric semi-exploded view of an angular portion in accordance with at least one embodiment of the invention.

In the present embodiment, as shown in FIG. 16, each stator phase module 33 is built with a sufficiently mechanically resistant material machined to form proper shapes therein and includes four angular portions 146 (for instance, four angular portions 146 of 90° [mechanical] each=360° [mechanical] once assembled together for a complete stator phase module 32) that are assembled together to locate and secure the cores 130 and the coil 134 within the phase module 32. The embodiment illustrated in FIG. 16 uses four (4) angular portions 146 and could alternatively use a different number of angular portions as long as they complete 360° [mechanical] without departing from the scope of the present application. In the present embodiment illustrated in FIG. 17, each angular portion 146 in composed of two halves 150 secured together with fasteners 154 and further respectively located with pins 158. The halves 150 are sized and designed to receive therein a predetermined number of cores 130 with a precise stator skew angle α. The core's 130 legs 142 are ending with a pair of poles 138 extending from the pair of halves 150 through openings 160 therein for electromagnetically engaging the concentrators 98. One can appreciate that the distances between the sides of the angular portion 146 and their first respective adjacent core 130 is not the same on each halve 150 because of the core 130 skewing. This could have an influence on reference locations of the angles indicated in FIG. 19 and FIG. 20 depending of the reference point used to locate the cores 130.

Figure 18:
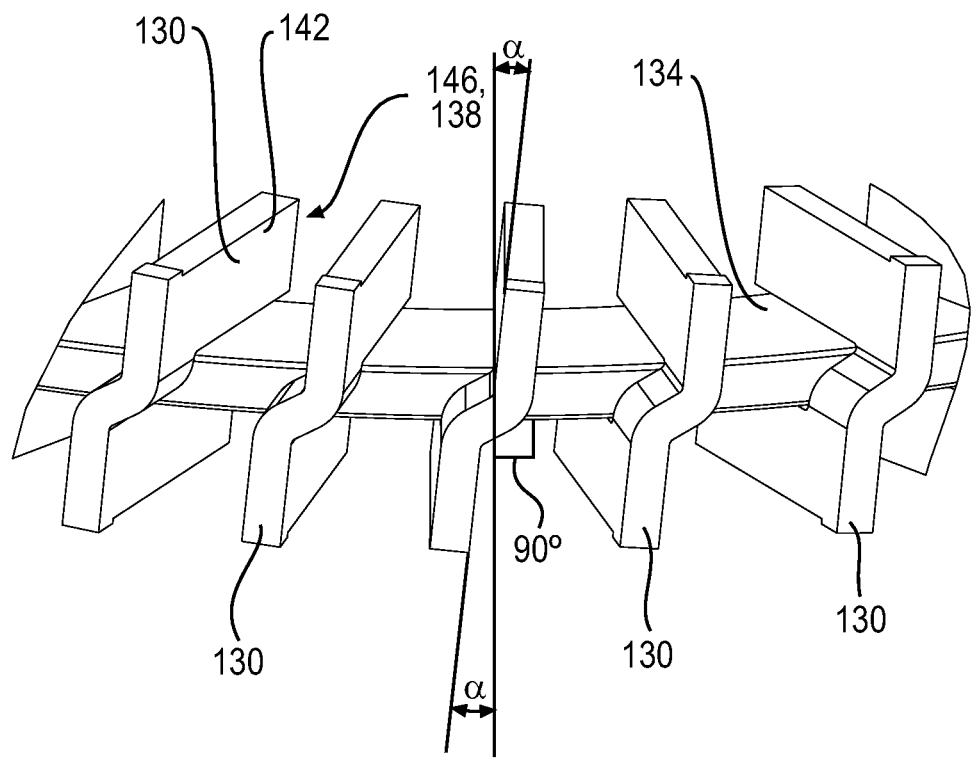
FIG. 18 an isometric partial assembly of a phase module in accordance with at least one embodiment of the invention.

FIG. 18 depicts some isolated cores 130 and associated coil 134 sub-assemblies to more clearly illustrate the angle α of the stator skew. The cores 130 and the coil 134 are in the same position as if they were within their angular portion 146 (not illustrated), both halves 150 (not illustrated) of the angular portion 146 however, has been removed so that a reader can better appreciate the relative position of the cores 130 and the coil 134 in the assembly. From FIG. 18 the skilled reader can appreciate that the cores 130 are collectively disposed precisely at angle α to provide the desired stator skew and also respectively disposed at predetermined angular distances from each other.

Figure 19:
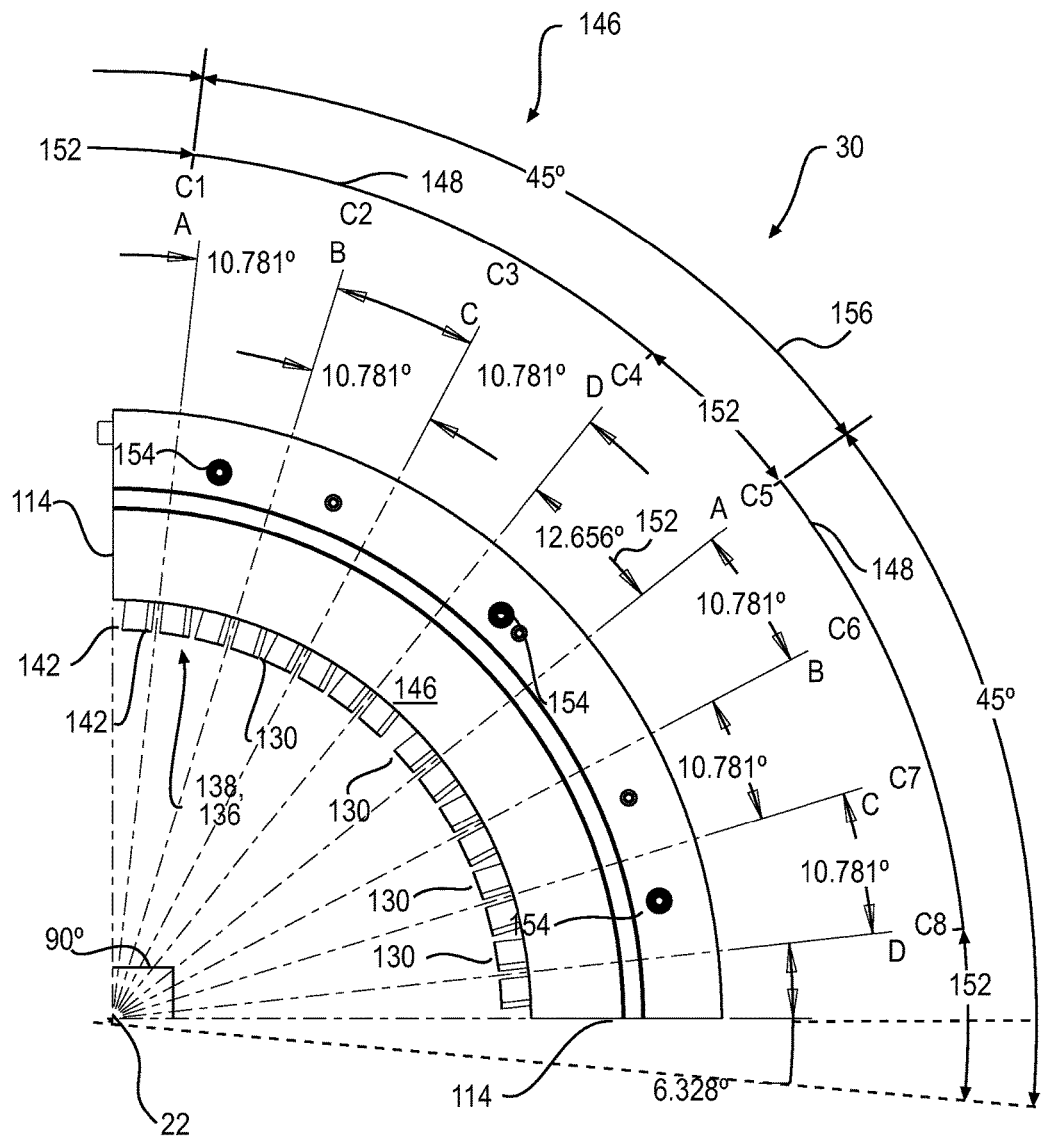
FIG. 19 a front elevational view of an angular portion illustrating relative angles between a plurality of cores in accordance with at least one embodiment of the invention.
Figure 20:
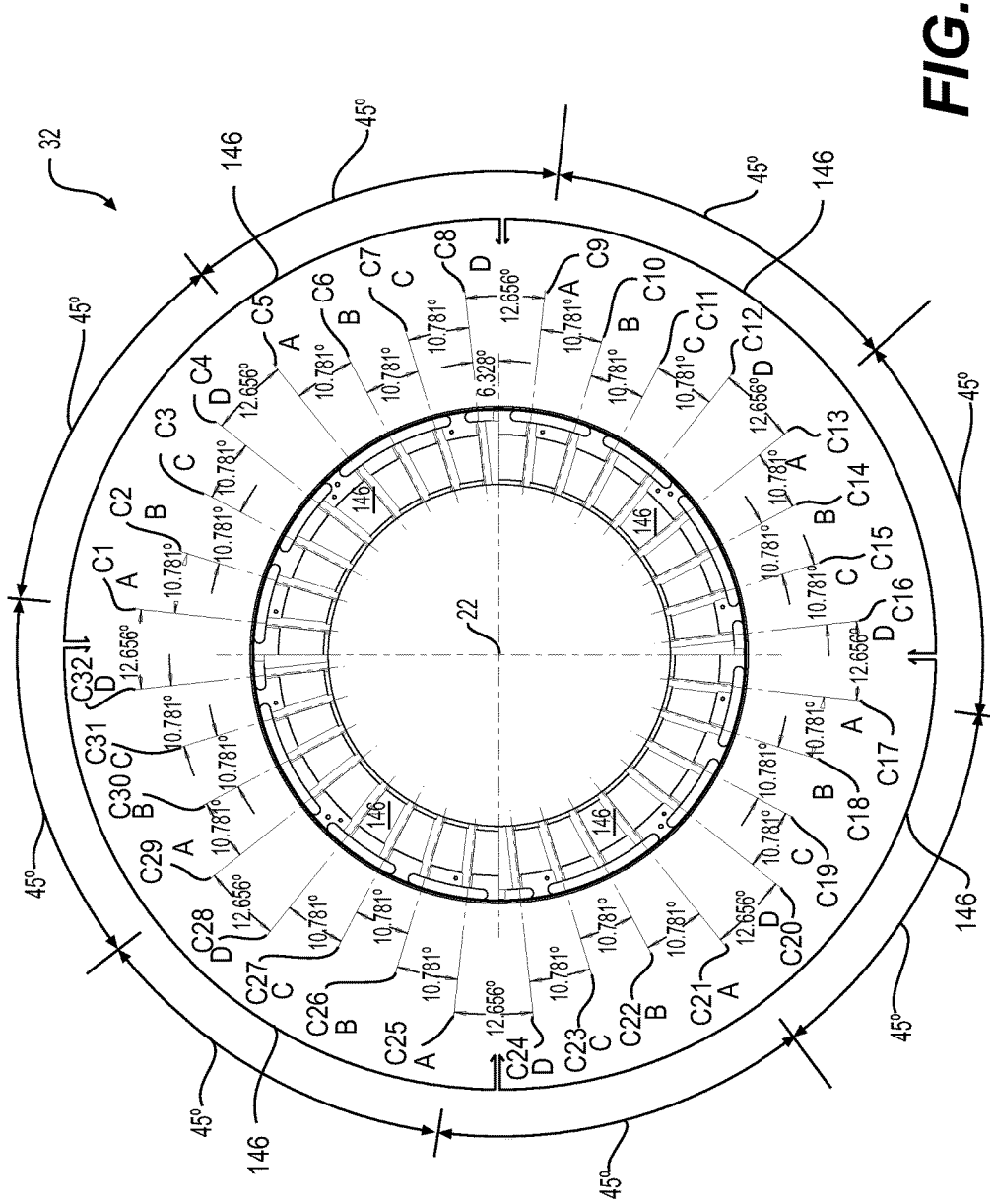
FIG. 20 a front elevational view of a phase module illustrating relative angles thereof in accordance with at least one embodiment of the invention.

Moving now to FIG. 19 and FIG. 20, a skilled reader can appreciate the angles about which are respectively polarly located the cores 130 in a phase module 32. The angles are applied to four (4) angular portions 146 of the embodiment (as indicated above, the illustrated embodiment has four (4) angular portions of 90° each). The relative angles are to be considered between a same reference point on each core 130. More specifically, FIG. 19 depicts an angular portion 146 including eight (8) poles 136 respectively identified C1-C8. In this embodiment, poles C1-C4 form a set 148 of poles 136 where the intervening angles (10.781°[mechanical]) between the repeated angular sequences of poles A, B, C, D is constant. The intervening angle (10.781°[mechanical]) could be different and remain constant if the number of cores 130 present in a set 148 of poles 136 is different without departing from the scope of the present application.

A set 148 of poles 136 is repeated with intervening radial angle 152 that has a value adapted to complete an angle of 45°[mechanical] 156 in the present illustrative embodiment. The actual intervening angle 152 of the illustrated embodiment is 12.656°[mechanical] and this angle, required to complete the angle of 45° of the embodiment, could be different should another configuration of set 148 of poles 136 be desirable. In other words, a new set of poles 148 begins each 45°[mechanical] and is repeated a number of times in the present configuration. The number of sets 148 in the illustrative embodiment is eight (8), two per angular portion 146 of 90°. The angle of 45° of the embodiment is 360°[mechanical]/8 and could alternatively be 30°, 60° or 90° and fit in the angular portion 146 of 90° in the illustrated embodiment.

Another unillustrated embodiment of sets 148 includes two (2) cores 130 with a predetermined intervening angular distance (or angle thereof). The set 148 of two cores 130 is separated from the next set 148 of two cores 130 with a different intervening angular distance. This alternate arrangement of sets 148 repetition is used to build a complete core module 32.

One can appreciate from the illustrated embodiment that the cores 130 are identical and their respective locations dictates the respective locations of their associated poles 136. Other possible embodiment could use cores 130 that are not all identical and the location the poles 136 should prevail to ensure proper function of the TFEM.

Figure 21:
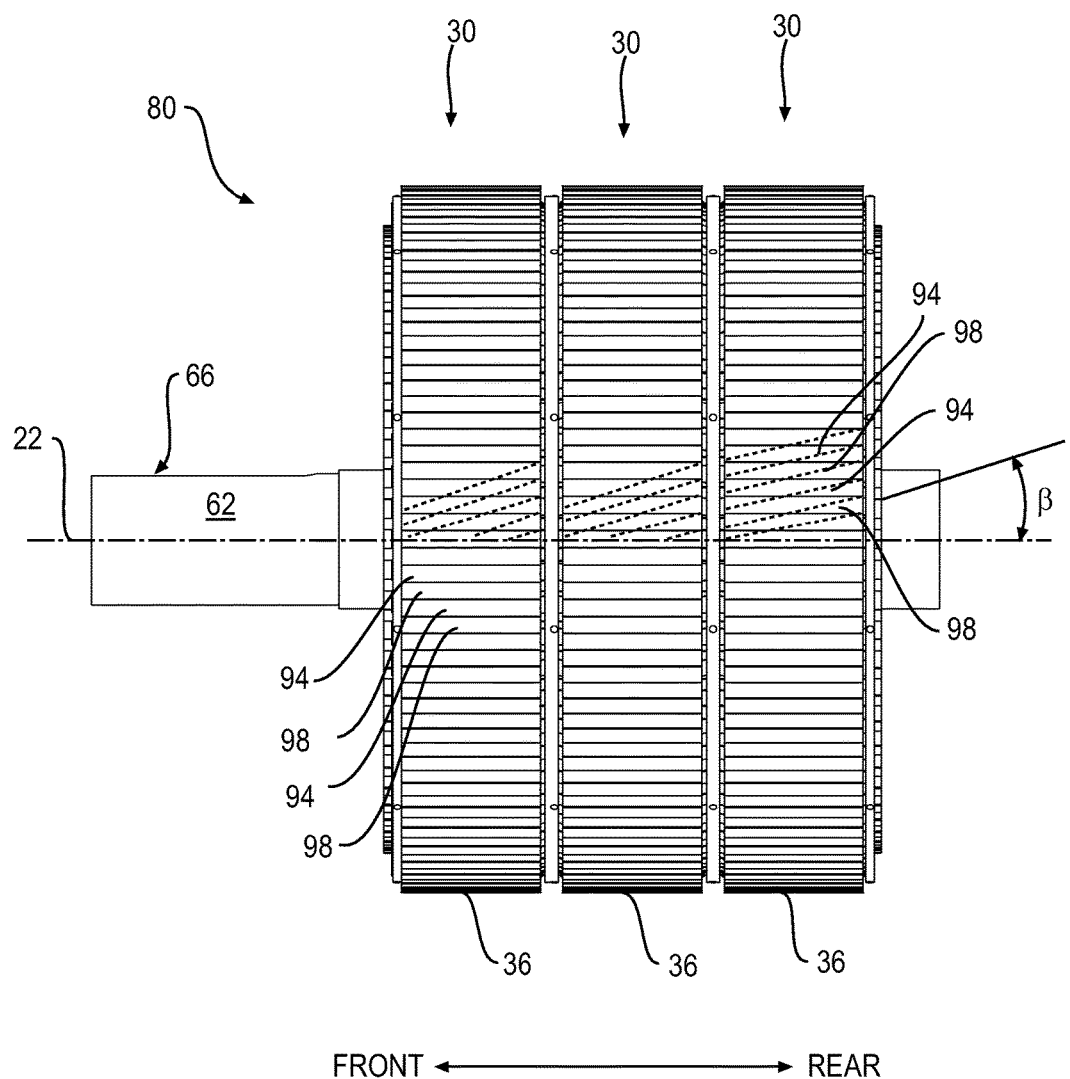
FIG. 21 a side elevational view of a rotor portion in accordance with at least one embodiment of the invention.

Another element is the rotor skew exemplified by angle β in FIG. 21, depicting a stator 80. There are superposed a first polar layout of magnets 94 and intervening concentrators 98 (in solid lines) parallelly disposed in respect with the rotation axis 22 at a 0° angle thereof. The skewed rotor configuration is represented by a second schematic (and incomplete) polar layout of magnets 94 and intervening concentrators 98 (in dotted lines) disposed on the rotor 80 at an angle β in respect with the rotation axis 22. The three (3) phases 30 preferably use the same angle for the layout or magnets 94 and concentrators 98 with the rotation axis 22. Similarly, the progressive electromagnetic interference with the cores 130 (not shown in FIG. 20) has an effect on the ripple torque and cogging torque discussed above. The three phases 30 of the rotor portion 18 illustrated in FIG. 21 are axially aligned and could alternatively be phase shifted, for example by 120°, from one another, to replace or complement a phase shifted stator.

Figure 22:
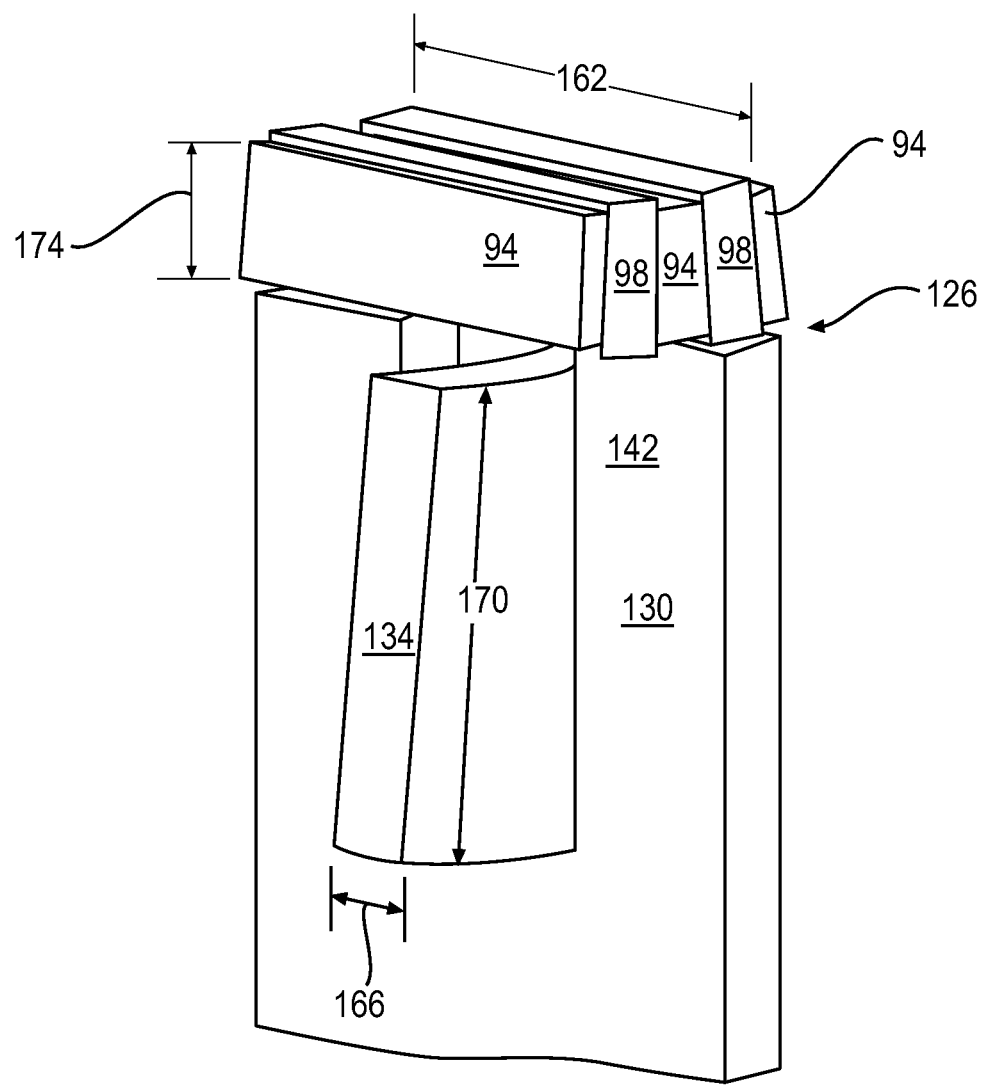
FIG. 22 an isometric view of a portion of a coil and cores assembly in accordance with at least one embodiment of the invention.

Yet another element to consider is the number of pairs of poles n. The number of pairs of poles n is equal to the number of cores 130 given that there are two poles 138 per core 130. The number of magnets 94 is equal to the number of concentrators 98 and their number is twice the number of pairs of poles n and consequently also twice the number of cores 130. The number of pairs of poles n is preferably 32 as exemplified in the present application. Turning now to FIG. 22 where other elements like the magnetic length 162, the coil length 166, the coil height 170 and the magnet height 174 are illustrated in a schematic illustration of a partial core 130 assembly, with a coil 134, in conjunction with an alternate suite of magnets 94 and concentrators 98. The magnetic length 162 of the illustrative embodiment use a single magnet 94 however, multiple adjacent smaller magnets 94 (not illustrated) could be longitudinally cooperating to replace a single longer magnet 94. As one can appreciate from FIG. 22, each core 130 extends to two adjacent magnets 94 or two adjacent concentrators 98. The air gap 126 between the core 130 and the magnets 94 and concentrators 98 is also identified.

Figure 23:
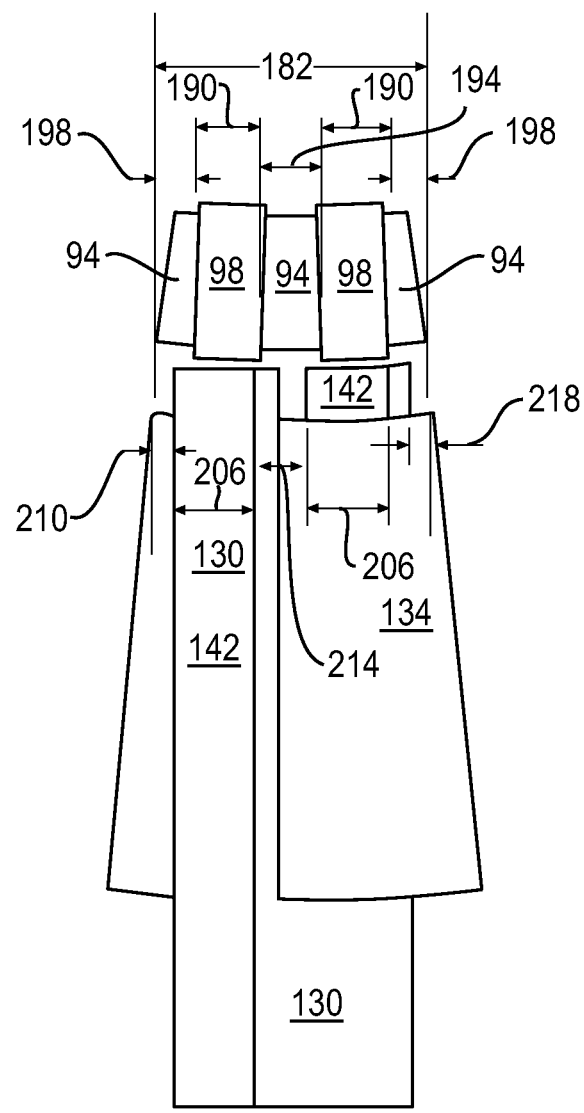
FIG. 23 is a front elevational view of a portion of a coil and cores assembly in accordance with at least one embodiment of the invention.

The overlap rotor is a proportion of a tangential width of the concentrators 98 in respect with the tangential width of the magnets 94. A pole pitch 182 is establish on the basis that 360° [electrical] on the rotor 80 is represented by two (2) concentrators 98 and two (2) magnets 94 having a same width. Their collective width is equal to one (1); hence, the width of a magnet 94 and the width of a concentrator 98 is 25% of their collective width. A rotor overlap 186 of 0% means that the width of the concentrators 190, 98 is equal to the width of the magnets 194, 94 as it is illustrated in FIG. 23. A way to separate a complete 360° [electrical] cycle on the rotor 80 implies to cut two equally 198 two (2) magnets 94 as it is illustrated in FIG. 22. The optimal rotor overlap 186 indicated in Table 2 below is 0%. 0% rotor overlap 186 translates in a width of the concentrators 190, 98 that is equal to the width of the magnets 194, 94. In contrast, a 25% rotor overlap 186 means that the width of the concentrators 190, 98 is 25% longer than the width of the magnets 194, 94 for a same pole pitch 182. In other words, the concentrators 190 are taking 25% more space than the magnets 94 and less magnet material is required to build a rotor 80.

The same principle is applied to the stator overlap 202. The overlap stator is a proportion of a tangential width of the core's leg 142 in respect with the pole pitch 182. The pole pitch 182 is established on the same basis that 360° [electrical] on the stator is represented by the same tangential length of two (2) concentrators 98 and two (2) magnets 94. The nominal width 206 of a core's leg 142 is 25% of the pole pitch 182. A stator overlap 202 of 0% means that the width 206 of the core's leg 142 is 25% of the pole pitch 182. The remaining added widths 210, 214 and 218 should represent 50% of the pole pitch 182. The optimal stator overlap 202 indicated in Table 2 below is 20%. 20% stator overlap 202 translates in a width 206 of the core's leg 142 is 20% more than 25% of the pole pitch 182.

Following in Table 2, is presented a set of preferred ranges about which each elements discussed above, material in the reduction or the cancellation of the cogging torque and the ripple torque in a transverse flux electrical machine, are detailed.

TABLE 2

|     | Poor  | Accept. | Average | Good | Optimal | Good | Average | Accept. | Poor |
|-----|-------|---------|---------|------|---------|------|---------|---------|------|
| n   | 1     | 19      | 20      | 27   | 28      | 32   | 36   | 37   | 44   | 45   | ∞ |
| 162 | 0     | 39      | 40      | 59   | 60      | 100  | 150  | 151  | 200  | 201  | ∞ |
| 166 | 0%    | 10%     | 11%     | 19%  | 20%     | 23%  | 25%  | 26%  | 33%  | 34%  | ∞ |
| 170 | 0%    | 39%     | 40%     | 69%  | 70%     | 100% | 120% | 121% | 150% | 151% | ∞ |
| 174 | 0%    | 16%     | 17%     | 21%  | 22%     | 25%  | 29%  | 30%  | 33%  | 34%  | ∞ |
| β   | −90°  | 0°      | 0°      | 0°   | 0°      | 0°   | 8°   | 9°   | 11°  | 12°  | 90° |
| α   | −90°  | 0°      | 0°      | 4°   | 4°      | 6°   | 8°   | 9°   | 11°  | 12°  | 90° |
| 186 | −100% | −11%    | −10%    | 0%   | 0%      | 0%   | 25%  | 26%  | 35%  | 36%  | 100% |
| 202 | −100% | −6%     | −5%     | 0%   | 0%      | 20%  | 25%  | 26%  | 30%  | 31%  | 100% |

Table 3 below provides quantitative data representing the diameter 178 of the TFEM 10 at the air gaps 126. A same number of pairs of poles 138 can be used when the diameter 178 changes. It is also possible to add additional pairs of poles 138 when the diameter 178 is increased and to remove pairs of poles 138 when the diameter is reduced.

TABLE 3

|     | Poor | Accept. | Average | Good | Optimal | Good | Average | Accept. | Poor |
|-----|------|---------|---------|------|---------|------|---------|---------|------|
| 178 | 0    | 99      | 100 199 | 200  | 510     | 2200 | 2201 4000 | 4001  | ∞    |

Figure 24:
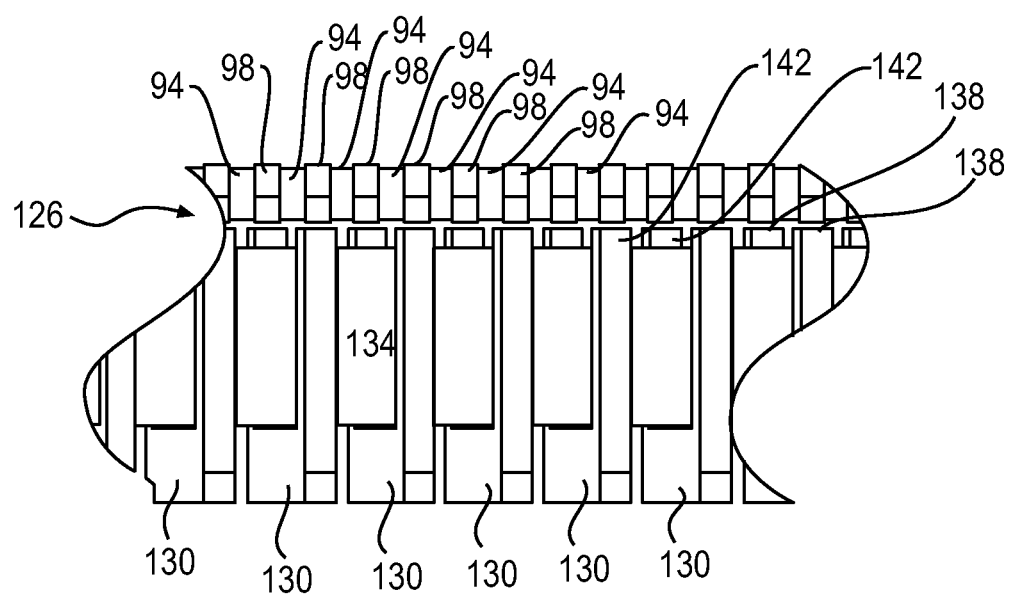
FIG. 24 is a side elevational view of a linear TFEM in accordance with at least one embodiment of the invention.
Figure 25:
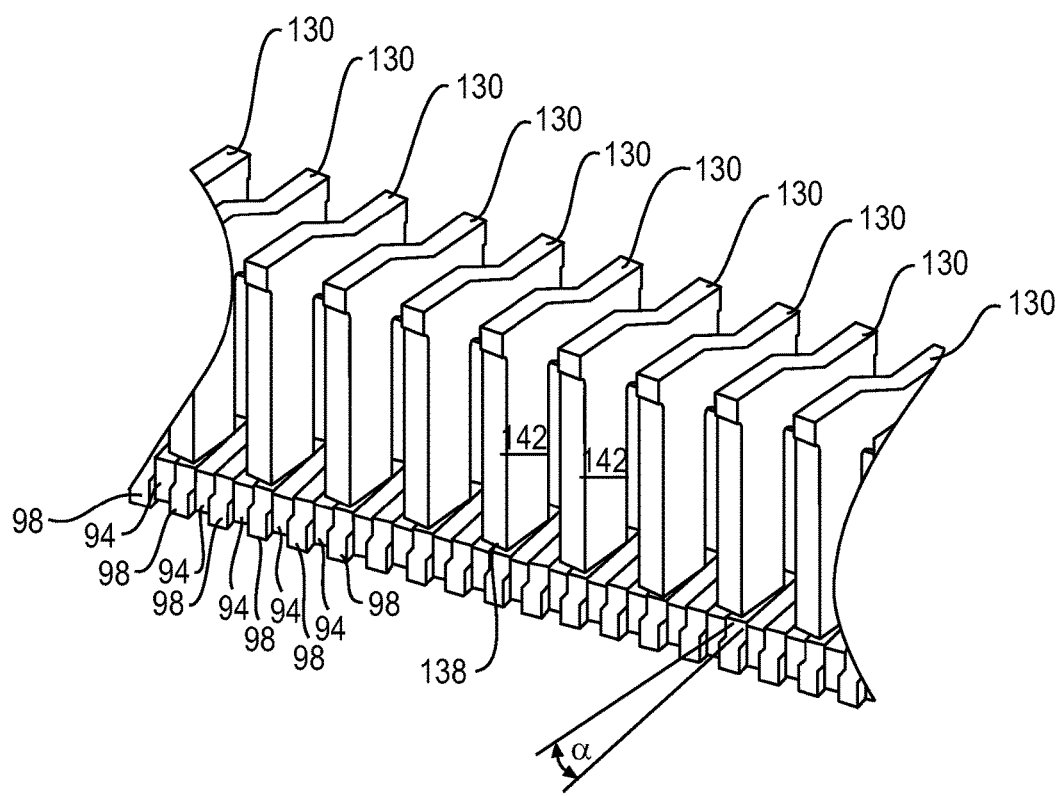
FIG. 25 is a isometric view of a linear TFEM in accordance with at least one embodiment of the invention.

FIGS. 24 and 25 illustrate a linear electrical machine that is applying the aforementioned features. As a skilled reader can appreciate, the angular dimensions discussed generally in reference with FIG. 19 and FIG. 20 are going to be replaced by equivalent lengths in electrical machines having a linear configuration. One can see that the alternate row of magnets 94 and concentrators 98 are in a rectilinear arrangement as opposed to a circular arrangement as explained in reference with FIGS. 1 through 23. A cooperative linear arrangement of cores 130 and a linear coil 134 are also illustrated on the other side of the air gap 126. The description made in reference with a rotatable TFEM 10 is applicable to a linear electrical machine where the stator portion 14 becomes a fixed portion and the rotor portion 18 becomes the movable portion. Hence, the angular distance becomes a longitudinal distance along a longitudinal axis as opposed to the rotational axis 22 used in reference with the rotatable TFEM 10.

The description and the drawings that are presented above are meant to be illustrative of the present invention. They are not meant to be limiting of the scope of the present invention. Modifications to the embodiments described may be made without departing from the present invention, the scope of which is defined by the following claims:

What is claimed is:

1. A rotatable transverse flux electrical machine (TFEM) comprising:
   a stator portion; and
   a rotor portion rotatably located with respect to the stator portion, the rotor portion including an alternate sequence of individual magnets and individual concentrators radially disposed about a rotation axis thereof, each concentrator including a circumferential width for concentrating an electromagnetic field of a polarity of a pair of adjacent magnets;
   the stator portion including at least one phase, the at least one phase including a plurality of cores cooperating with a coil orthogonally disposed about the rotation axis, the plurality of cores being secured inside a pair of halves within respective core-receiving spaces therein, each core including a pair of legs interconnected with an intermediate core portion, the intermediate core portion circumferentially offsetting the pair of legs from one another, the pair of legs ending with a pair of poles extending from the pair of halves through openings therein for electromagnetically engaging the concentrators, the pair of legs and the pair of poles including a circumferential thickness, the pair of poles axially skewed about the rotation axis, forming a non-ninety-degree angle with the coil, to progressively electromagnetically engage the electromagnetic field of respective cooperating concentrators to reduce a cogging torque when the TFEM is in operation.

2. The rotatable transverse flux electrical machine (TFEM) of claim 1, further comprising three phases, the three phases axially disposed and phase-shifted 120° of an electrical cycle.

3. The rotatable transverse flux electrical machine (TFEM) of claim 1, wherein the number of pair of poles is 32.

4. The rotatable transverse flux electrical machine (TFEM) of claim 1, wherein the skew of the pair of poles is between 4° and 8°.

5. The rotatable transverse flux electrical machine (TFEM) of claim 1, wherein the alternate sequence of individual magnets and concentrators is skewed between 0° and 8° about the rotation axis.

6. The rotatable transverse flux electrical machine (TFEM) of claim 1, wherein a magnet length is between 60 mm and 150 mm.

7. The rotatable transverse flux electrical machine (TFEM) of claim 6, wherein a coil length is between 20% and 25% of the magnet length.

8. The rotatable transverse flux electrical machine (TFEM) of claim 6, wherein a coil height is between 70% and 120% of the magnet length.

9. The rotatable transverse flux electrical machine (TFEM) of claim 6, wherein a magnet height is between 22% and 29% of the magnet length.

10. The rotatable transverse flux electrical machine (TFEM) of claim 1, wherein the rotor concentrators circumferential width is between 0% and 25% more than a circumferential width of the rotor magnet.

11. The rotatable transverse flux electrical machine (TFEM) of claim 1, wherein a circumferential width of at least some of the pair of poles is between 0% and 25% more than the circumferential width of the concentrator.

12. The rotatable transverse flux electrical machine (TFEM) of claim 1, wherein a diameter of TFEM at an air gap is between 200 mm and 2200 mm.

13. The rotatable transverse flux electrical machine (TFEM) of claim 1, wherein the at least one phase includes at least 2 angular portions.

14. The rotatable transverse flux electrical machine (TFEM) of claim 13, wherein one angular portion includes at least two sets of poles.

15. The rotatable transverse flux electrical machine (TFEM) of claim 14, wherein each of the at least two sets of poles include three cores radially located in their angular portion with a same intervening angle thereof.

16. The rotatable transverse flux electrical machine (TFEM) of claim 1, wherein the at least one phase includes at least two sets of poles.

17. A method of assembling a rotatable transverse flux electrical machine (TFEM), the method comprising:
   radially assembling a rotor portion with a plurality of alternated sequence of individual magnets and individual concentrators radially disposed about a rotation axis thereof, each concentrator including a circumferential width for concentrating an electromagnetic field of a polarity of a pair of adjacent magnets;
   radially assembling a single phase stator portion with a plurality of cores adapted to cooperate with a coil orthogonally disposed about a rotation axis, the plurality of cores being secured inside a pair of halves within respective core-receiving spaces therein, each core including a pair of legs interconnected with an intermediate core portion, the intermediate core portion circumferentially offsetting the pair of legs from one another, the pair of legs ending with a pair of poles extending from the pair of halves through openings therein for electromagnetically engaging the concentrators, the pair of legs and the pair of poles including a circumferential thickness, the pair of poles being axially skewed about the rotation axis, forming a non-ninety-degree angle with the coil to progressively electromagnetically engage the electromagnetic field of respective cooperating concentrators;

assembling the coil in the stator portion in electromagnetic cooperation with the plurality of cores; and assembling the stator portion in the rotor portion about the rotation axis for allowing rotation of the rotor portion with respect to the stator portion, wherein, the skewed pairs of poles are progressively, electromagnetically engaging an electromagnetic field of respective cooperating concentrators when the rotor rotates about the stator to reduce a cogging torque when the TFEM is in operation.

18. The method of claim 17, further comprising two additional stator phases, the three phases axially disposed and phase shifted 120° of an electrical cycle.

19. A rotatable transverse flux electrical machine (TFEM) kit comprising:

a stator portion including a rotation axis thereof;

a rotor portion sized and designed to be rotatably assembled with the stator portion about the rotation axis thereof, the rotor portion including an alternate sequence of individual magnets and individual concentrators radially disposed about the rotation axis thereof, each concentrator including a circumferential width for concentrating an electromagnetic field of a polarity of a pair of adjacent magnets;

the stator portion including at least one phase, the at least one phase including a plurality of cores cooperating with a coil disposed about the rotation axis, the plurality of cores being secured inside a pair of halves within respective core-receiving spaces therein, each core including a pair of legs interconnected with an intermediate core portion, the intermediate core portion circumferentially offsetting the pair of legs from one another, the pair of legs ending with a pair of poles extending from the pair of halves through openings therein for electromagnetically engaging the concentrators, the pair of legs and the pair of poles including a circumferential thickness, the pair of poles axially skewed about the rotation axis forming a non-ninety degree angle with the coil, to progressively electromagnetically engage the electromagnetic field of respective cooperating concentrators to reduce a cogging torque when the TFEM is in operation when the rotor portion is rotating with respect to the stator member.

20. The transverse flux electrical machine (TFEM) kit of claim 19, wherein the pair of poles is axially skewed about the rotation axis of about between 4° and 8°.

* * * * *